US010371500B2

(12) United States Patent
Seitz et al.

(10) Patent No.: US 10,371,500 B2
(45) Date of Patent: Aug. 6, 2019

(54) INCIDENT-LIGHT ILLUMINATION FOR A VARIABLE WORKING DISTANCE

(71) Applicant: CARL ZEISS INDUSTRIELLE MESSTECHNIK GMBH, Oberkochen (DE)

(72) Inventors: Dominik Seitz, Schwaebisch Gmuend (DE); Nils Haverkamp, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 40 days.

(21) Appl. No.: 15/726,425

(22) Filed: Oct. 6, 2017

(65) Prior Publication Data
US 2018/0066933 A1 Mar. 8, 2018

Related U.S. Application Data

(63) Continuation of application No. PCT/EP2016/057497, filed on Apr. 6, 2016.

(30) Foreign Application Priority Data

Apr. 13, 2015 (DE) .................... 10 2015 105 613

(51) Int. Cl.
*G01B 11/00* (2006.01)
*G02B 3/00* (2006.01)
(Continued)

(52) U.S. Cl.
CPC .............. *G01B 11/005* (2013.01); *F21V 5/04* (2013.01); *F21V 14/06* (2013.01); *G02B 3/0037* (2013.01);
(Continued)

(58) Field of Classification Search
CPC . G02B 3/0037; G02B 6/0001; F21Y 2115/10; G01B 11/005; G01B 11/00; F21V 5/04; F21V 5/06
(Continued)

(56) References Cited

U.S. PATENT DOCUMENTS 4,963,728 A 10/1990 Hof et al.
5,038,258 A 8/1991 Koch et al.
(Continued)

FOREIGN PATENT DOCUMENTS

DE 102004033603 A1 2/2006
EP 0362625 A2 4/1990
(Continued)

OTHER PUBLICATIONS

International Search Report (English translation attached) and Written Opinion of the International Searching Authority (German language) for PCT/EP2016/057497; dated Jun. 28, 2016;14 pp.
(Continued)

*Primary Examiner* — William R Alexander
(74) *Attorney, Agent, or Firm* — Harness, Dickey & Pierce, P.L.C.

(57) ABSTRACT

A lens device for an illumination assembly. The lens device has light-entry and light-exit surfaces and comprises at least one ring region. Each ring region extends along a circumferential direction about a central axis of the lens device, and comprises a plurality of area segments. Each area segment forms a circular arc portion of a respective ring region and comprises a first end in the circumferential direction and a second end opposite to the first end in the circumferential direction. At the first end, the light-exit surface is inclined in the direction of the central axis by an arbitrary first angle in relation to the light-entry surface, and at the second end, the light-exit surface is inclined in the direction of the central
(Continued)

axis by an arbitrary second angle in relation to the light-entry surface differing from the first angle.

21 Claims, 17 Drawing Sheets

(51) Int. Cl.
    *F21V 5/04*     (2006.01)
    *F21V 14/06*     (2006.01)
    *F21V 8/00*     (2006.01)
    *F21Y 115/10*     (2016.01)

(52) U.S. Cl.
    CPC ......... *G02B 6/0001* (2013.01); *F21Y 2115/10* (2016.08)

(58) Field of Classification Search
    USPC .......................................................... 359/742
    See application file for complete search history.

(56) References Cited

U.S. PATENT DOCUMENTS

| | | | |
|---|---|---|---|
| 6,061,184 A | | 5/2000 | Zehetner |
| 6,353,508 B1* | | 3/2002 | Burke ............... G02B 3/08 |
| | | | 348/44 |
| 6,454,437 B1* | | 9/2002 | Kelly ................ G01J 3/10 |
| | | | 359/287 |
| 6,948,825 B2 | | 9/2005 | Christoph |
| 7,286,284 B2 | | 10/2007 | Totzeck et al. |
| 7,995,832 B2* | | 8/2011 | Xiong ............. G01N 21/95607 |
| | | | 382/144 |
| 8,390,927 B2* | | 3/2013 | Heiden ............... G02B 5/3025 |
| | | | 359/486.01 |
| 9,030,383 B2 | | 5/2015 | Lindig et al. |
| 9,335,569 B1 | | 5/2016 | Levine |
| 9,453,718 B2 | | 9/2016 | Engel |
| 2005/0225763 A1 | | 10/2005 | Rehm et al. |
| 2006/0012873 A1* | | 1/2006 | Totzeck ............... G02B 5/3025 |
| | | | 359/386 |
| 2010/0134869 A1* | | 6/2010 | Bernet ................ G02B 5/001 |
| | | | 359/290 |
| 2014/0226356 A1 | | 8/2014 | Yagi |
| 2016/0102838 A1* | | 4/2016 | Li ..................... H01L 33/58 |
| | | | 362/311.02 |

FOREIGN PATENT DOCUMENTS

| | | |
|---|---|---|
| EP | 0385262 | 9/1990 |
| EP | 0969304 A2 | 1/2000 |
| EP | 1373827 B1 | 1/2004 |
| EP | 1698930 A2 | 9/2006 |
| EP | 2351963 B1 | 8/2011 |
| GB | 2256937 A | 12/1992 |
| JP | 2013231814 A | 11/2013 |
| WO | WO 95/32447 | 11/1995 |
| WO | 2010/034639 A2 | 4/2010 |
| WO | 2013/167168 A1 | 11/2013 |

OTHER PUBLICATIONS

English language translation of International Preliminary Report on Patentability (Chapter I) for PCT/EP2016/057497; dated Oct. 17, 2017; 7 pp.

German Examination Report (English translation attached); dated Mar. 10, 2016;12 pp.

* cited by examiner

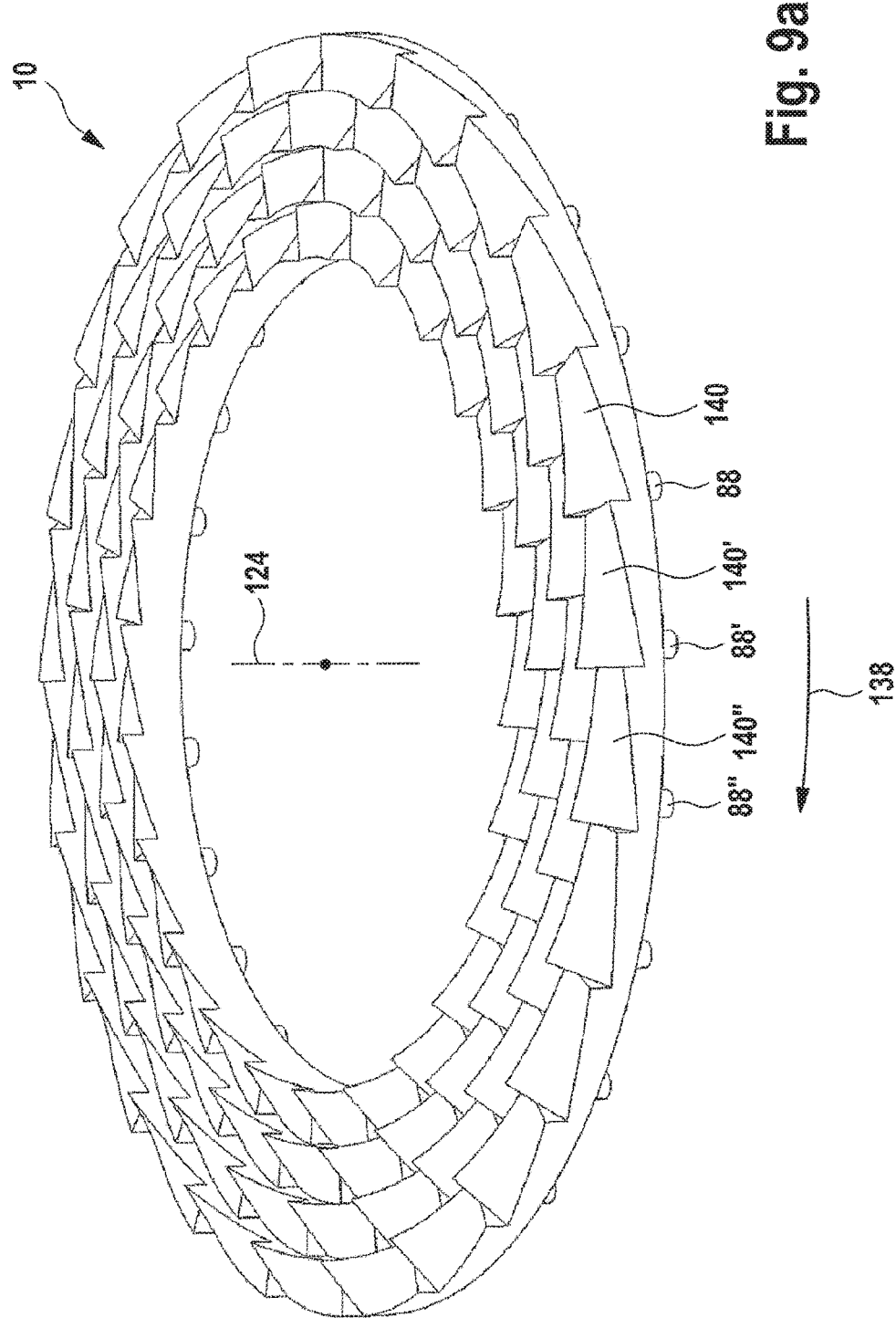

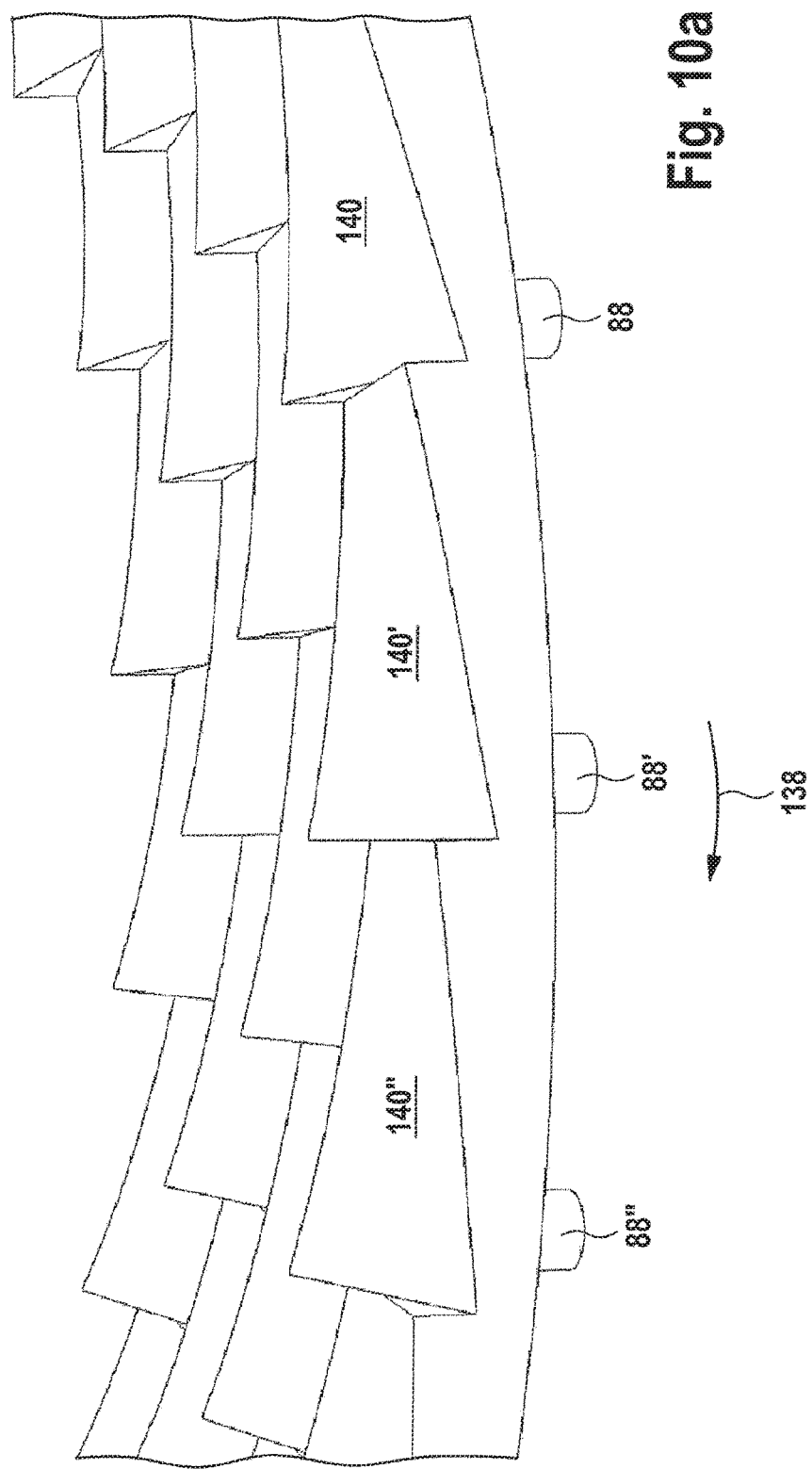

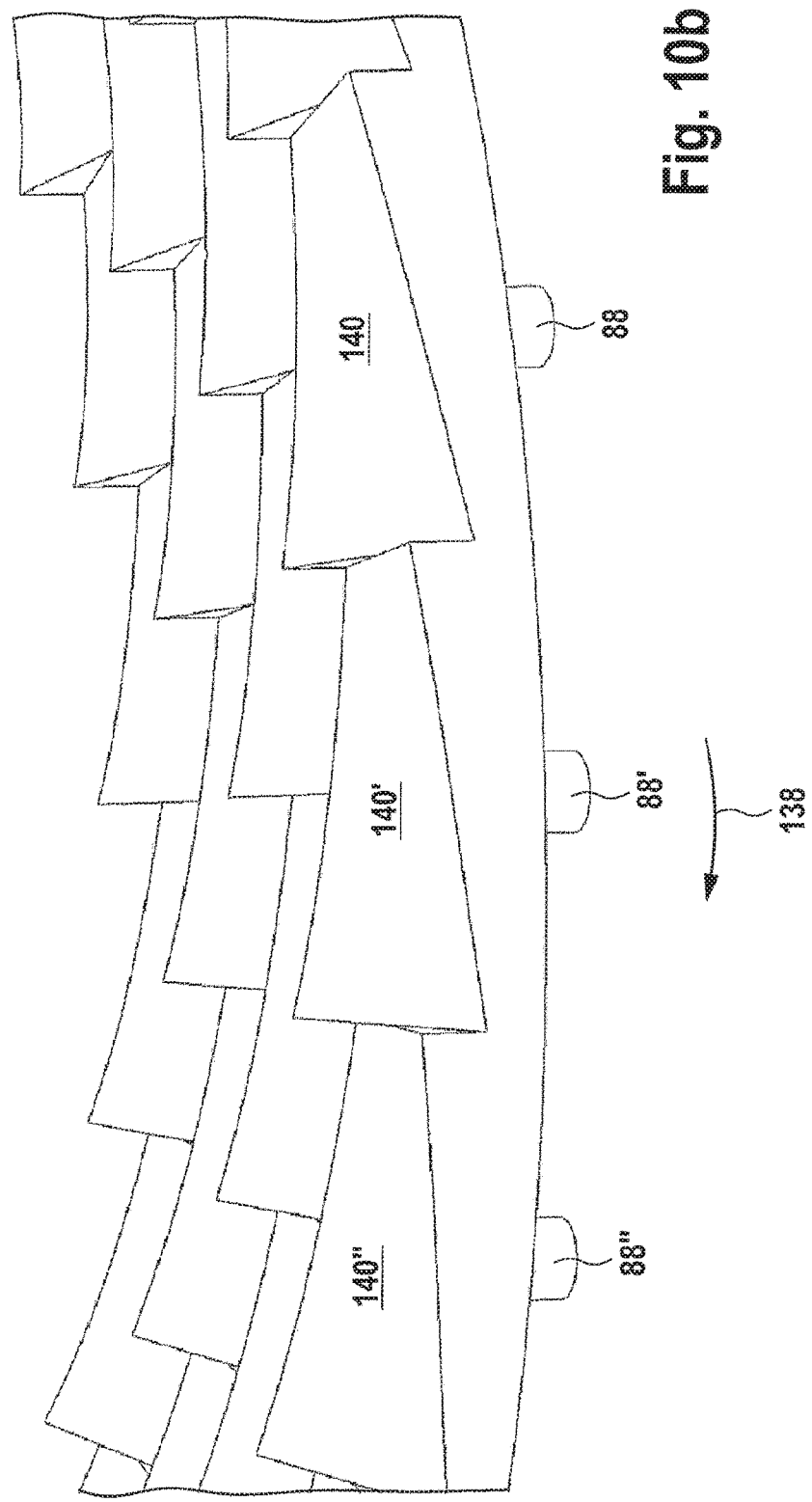

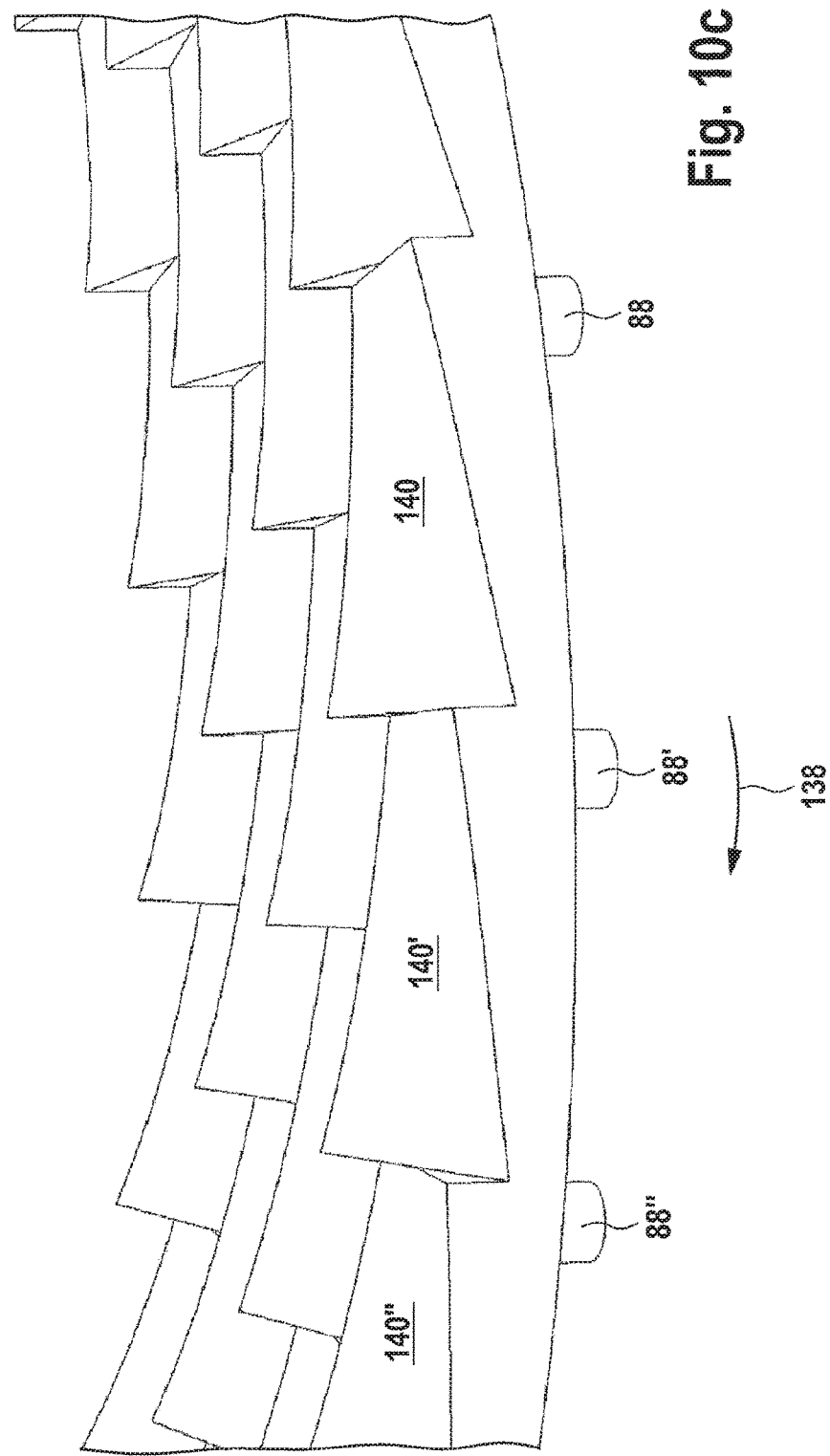

INCIDENT-LIGHT ILLUMINATION FOR A VARIABLE WORKING DISTANCE

CROSS-REFERENCE TO RELATED APPLICATIONS

This is a Continuation application of International patent application PCT/EP2016/057497, filed Apr. 6, 2016, which claims the priority of German patent application DE 10 2015 105 613.5, filed Apr. 13, 2015. The entire content of both applications is herewith incorporated by reference.

BACKGROUND OF THE INVENTION

The present invention relates to a lens device for an illumination assembly. Moreover, the present invention relates to an illumination assembly for a measuring machine for measuring a workpiece by means of an optical sensor. Moreover, the present invention relates to a coordinate measuring machine for measuring a workpiece by means of an optical sensor. Moreover, the present invention relates to a method for modifying an illumination working distance of a dark field top light illumination of a coordinate measuring machine.

Coordinate measuring machines are used to check workpieces, for example as part of quality assurance, or to determine the geometry of a workpiece completely as part of what is known as "reverse engineering". Moreover, multifarious further application possibilities are conceivable.

In coordinate measuring machines of this type, different types of sensors may be used to capture the coordinates of a workpiece to be measured. By way of example, sensors that measure in tactile fashion are known in this respect, as are sold, for example, by the applicant under the product designation "VAST", "VAST XT" or "VAST XXT". Here, the surface of the workpiece to be measured is probed with a stylus, the coordinates of said stylus in the measurement space being known at all times. Such a stylus may also be moved along the surface of a workpiece, such that a multiplicity of measurement points may be captured at set time intervals during such a measuring process within the scope of what is known as a "scanning method".

Furthermore, it is known practice to use optical sensors that facilitate contactless capturing of the coordinates of a workpiece. One example of such an optical sensor is the optical sensor sold by the applicant under the product designation "ViS-can".

The sensors may then be used in different types of measurement constructions. One example of such a measurement construction is the product "O-INSPECT" by the applicant. In an appliance of this type, both an optical sensor and a tactile sensor are used to carry out various examination tasks on a machine and ideally with a single setup of a workpiece to be measured.

Sensor systems comprising optical sensors are becoming increasingly more important in coordinate metrology. Here, optical sensors are distinguished, in particular, by a high speed of the measuring process. In this way it is possible to carry out many examination tasks, for example in medical engineering, plastics technology, electronics and precision engineering. Various other constructions are, of course, also conceivable.

Conventionally, the optical sensor head or the optical sensor is connected to a carrier system which supports and moves the optical sensor system. Various carrier systems are known from the prior art, for example portal systems, stand systems, horizontal arm systems and arm systems, and all types of robotic systems. Here, the carrier systems may moreover comprise system components which facilitate a positioning of the sensor head which is as flexible as possible. An example for this is the articulation from the applicant sold under the name "RDS". Moreover, various adapters for connecting the various system components of the carrier system among themselves and with the sensor system may be provided.

Moreover, it is conventional in coordinate metrology that work may be conducted with different types of illumination when measuring objects. By way of example, provision may be made of reflected light illumination which, for example, may be configured as bright field-dark field illumination. The corresponding optical sensors then comprise a video camera and/or an image camera and appropriate illumination for the workpiece. Moreover, a fixed imaging optical unit is usually provided, said fixed imaging optical unit imaging the workpiece to be measured onto the camera or the optical sensors of the camera. Here, in general, provision is made of specific optical sensors comprising fixedly integrated illuminations and imaging optical units for each application or each type of measurement.

By way of example, the document EP 0 362 625 A2 exhibits an interchangeable front optical unit for an optical sensing probe. This front optical unit is embodied for a specific working distance and a specific illumination type. Moreover, it comprises the whole lens which images light rays reflected by the workpiece onto the optical sensor.

However, such a front optical unit is relatively heavy on account of the optical elements for imaging purposes and has a relatively large volume. Moreover, such a front optical unit is only usable for a specific application, i.e. at a specific working distance and for a specific illumination type.

Moreover, documents EP 0 385 262 A2 and EP 1 373 827 B1 likewise specify illumination devices for coordinate measuring machines, said illumination devices, firstly, comprising imaging optical units and, secondly, comprising e.g. swivellable or movable illumination elements with a relatively complex embodiment in order to adjust the illumination to different working distances. However, this also results in a relatively complex structure of such illumination elements and, possibly, a relatively high weight and volume which makes regulating the optical sensor head more difficult on account of the higher inertia connected therewith, in particular in the case of fast measuring processes.

Document WO 2013/167168 A1 shows an illumination module for a coordinate measuring machine for measuring a workpiece by means of an optical sensor, wherein the illumination module comprises a main body with a sensor side and a workpiece side, wherein the illumination module comprises, on the main body, at least one illumination arrangement for illuminating the workpiece and wherein the at least one illumination arrangement has an emission characteristic with an emission angle and a light-intensity curve within the emission angle, wherein the light-intensity curve of the at least one illumination arrangement is asymmetric within the emission angle.

The workpiece should be illuminated in different ways dependent on the workpiece to be examined and the measuring method applied by means of the optical sensor. In the process, it is possible, for example, for a working distance, at which the measuring process is undertaken, to vary. Moreover, an illumination with different angles of incidence on a surface of the workpiece may be desired in certain circumstances. Therefore, in practice, illumination assemblies should either be interchanged or an illumination assembly comprises a plurality of alternately switchable light sources to provide the different types of illumination. However, such arrangements make an illumination assembly heavier on the one hand and, on the other hand, increase the costs of an illumination assembly. However, it is desirable, as a matter of principle, to be able to provide illuminations at different working distances and/or with different angles of incidence by means of one illumination assembly. Particularly in the case of a desired reflected light dark field illumination at a variable working distance, it is desirable to be able to set different angles of incidence as easily as possible.

It is therefore an object of the present invention to specify a lens device, an illumination assembly for a coordinate measuring machine comprising an optical sensor, a coordinate measuring machine and a method, which have a simple design and facilitate the greatest possible flexibility when using the optical sensor of the coordinate measuring machine, in particular the use of different working distances in the case of a dark field top light illumination.

BRIEF SUMMARY OF THE INVENTION

Therefore, in accordance with a first aspect of the invention, providing a lens device for an illumination assembly is proposed, said lens device comprising a light-entry surface and a light-exit surface, wherein the lens device comprises at least one ring region, wherein each ring region extends along a circumferential direction about a central axis of the lens device, wherein each ring region comprises a plurality of area segments, wherein each area segment forms a circular arc portion of a respective ring region and wherein each area segment comprises a first end in the circumferential direction and a second end opposite to the first end in the circumferential direction, wherein, at the first end, the light-exit surface is inclined in the direction of the central axis by an arbitrary first angle in relation to the light-entry surface and wherein, at the second end, the light-exit surface is inclined in the direction of the central axis by an arbitrary second angle in relation to the light-entry surface, said second angle differing from the first angle.

Therefore, the lens device is an optical lens element, i.e. a refractive optical element. It may be provided made of one of the conventional glass or plastic materials for refractive optical elements. As a matter of principle, such a lens device comprises two optically effective surfaces. These are denoted light-entry surface and light-exit surface.

The light-exit surface comprises at least one ring region. In principle, it may comprise exactly one ring region or more than one ring region. Each ring region is a portion or segment of a ring, or a completely closed ring. Hence, in the center thereof, the lens device has a cutout or free area through which the light rays may pass, in particular in order to reach the optical sensor of a coordinate measuring machine. Consequently, each ring region extends, in particular in a ring-shaped manner, along a circumferential direction about a central axis. Therefore, the location of the central axis is determined from the radius with which the ring regions extend along the circumferential direction about the central axis. Consequently, the central axis lies at the center point of the ring in the case of at least one ring region which extends in a completely closed manner as a ring. Each ring region extends along the circumferential direction about the central axis. Consequently, the central plane of each ring region or, in the case of planar configuration of the light-entry surface, the light-entry surface lies perpendicular to the central axis. Hence, the central axis may extend parallel to the direction through which radiation passes through the lens device.

Each ring region moreover comprises a plurality of area segments. Here, each area segment is a circular arc portion of the respective ring region. Consequently, as seen in the circumferential direction, the area segments lie in succession and together form the respective ring region. Consequently, each of the areas segments has a first end and an opposing second end in the circumferential direction. Here, the light-exit surface has such an embodiment that, at a first end, said light-exit surface is inclined in the direction of the central axis by a first angle in relation to the light-entry surface and, at the second end, said light-exit surface is inclined in the direction of the central axis by a second angle in relation to the light-entry surface. Here, the first angle and the second angle are different from one another. Consequently, the difference angle between the light-entry surface and the light-exit surface in the direction of the central axis varies over each lens segment. As a result, the prismatic deflection varies accordingly in the direction of the central axis. Consequently, the angle of inclination of the light-exit surface in relation to the light-entry surface in the direction of the central axis changes between the first end and the second end in each area segment.

Basic solutions for the posed problem would lie in, for example, securely assembling a dark-field reflected light illumination relative to the object to be measured. Naturally, however, this would then remove the advantage of being able to measure at different working distances. A further alternative would lie in individually swiveling each illumination arrangement, e.g. an LED (light-emitting diode), depending on the working distance. However, this requires a multiplicity of actuators or more than one kinematic system that is relatively complicated from a mechanical point of view if use is made of fewer actuators than illumination arrangements are present. Therefore, such solutions are often expensive and not implementable in practice.

However, using the proposed lens device renders it possible to modify the angle of incidence or the inclination angle of the light-exit surface in relation to the light-entry surface in the direction of the central axis. This is carried out by virtue of the lens device being rotated about the central axis. By way of example, an illumination arrangement can be assigned to each area segment. Then, in a first position, the relative arrangement of the lens device or of a respective area segment in relation to the illumination arrangement may be such that it is substantially the first angle that is effective. Rotating the lens device about the central axis then causes the second angle, which is different from the first angle, to substantially be effective in a second position. In this way, it is possible to illuminate at least two working distances or alternate between various working distances.

A "working distance" may be understood to mean, firstly, the mechanical working distance, i.e. the distance between the object to be measured which is to be observed and the measuring device. However, it may also be understood to mean the optical working distance, i.e. the clear space between the object to be measured and the first interference contour in the beam path of the optical sensor, for example a stop at an entry to a lens or an imaging optical unit.

The lens device may be configured to be rotatable by means of a single actuator. By way of example, this allows a cost-effective and, from a control engineering point of view, simple provision of a change in the working distance by rotating the lens device.

Moreover, provision may be made of e.g. a drive device which is embodied to move at least the lens device and/or further elements of the illumination assembly relative to an imaging optical unit in a manner parallel to an optical axis of the imaging optical unit and/or parallel to the central axis. By way of example, this then allows an optical working distance to be maintained and an angle of incidence of the illumination radiation in relation to the central axis to be modified while changing the mechanical working distance.

Accordingly, in accordance with a second aspect, provision is made of an illumination assembly for a measuring machine for measuring a workpiece, said illumination assembly comprising at least one illumination arrangement and a lens device in accordance with the first aspect or one of the configurations thereof. Moreover, the illumination assembly may comprise a drive device. The drive device may be embodied to rotate the lens device relative to the illumination arrangement.

This allows the angle of incidence of the illumination radiation to be varied and the working distance of e.g. a dark-field reflected light illumination arrangement to be adjusted in such a way that the field of view of the optical sensor to be measured, which is variable in the working distance, is illuminated very well or ideally by way of the dark-field reflected light illumination arrangement.

If use is made of a rotationally symmetric Fresnel lens for beam deflection purposes, the angle of incidence or inclination angle of the illumination radiation in relation to the central axis is constant. It is possible to vary the acting angle of the lens device by way of the proposed area segments with different angles. Then, it is possible to provide a modifiable acting angle of the lens device by rotating the lens device. In particular, each area segment is consequently embodied as a free-form surface. Here, "free-form surface" means that the surface does not have any symmetries. In particular, an area segment can be assigned to each light source or each illumination arrangement. In this way, only small movements of the lens device may also suffice to set the desired change in the working distance. In the case of reflected light illumination arrangements which, for example, have 24 light sources distributed over the circumference, the lens device would only have to be rotated by approximately 15° in order to be able to switch between the first angle and the second angle. By way of example, if the first angle is configured to be small and the second angle is configured to be large with a linear transition between the angles, a switch from a minimum to a maximum working distance can consequently be carried out by way of a rotation through only 15°.

In accordance with a third aspect, a coordinate measuring machine for measuring a workpiece by means of an optical sensor is proposed, said coordinate measuring machine comprising an illumination assembly in accordance with the second aspect or one of the configurations thereof, and wherein a measurement cone of the optical sensor extends along the central axis. In particular, the central axis can be identical to an optical axis of a lens of the optical sensor. In addition to a coordinate measuring machine, the measuring machine may, however, also be e.g. a microscope or any other type of measuring machine.

In accordance with a fourth aspect, a method for changing an illumination working distance of a dark field top light illumination of a coordinate measuring machine is proposed, wherein the coordinate measuring machine comprises an illumination assembly comprising a lens device, wherein the lens device extends, in particular in a ring-shaped manner, along a circumferential direction about a central axis of the lens device, and wherein the method comprises the step of rotating the lens device about the central axis. In particular, the illumination assembly comprises at least one illumination arrangement. In particular, the lens segment is then rotated about the central axis relative to the at least one illumination assembly.

In this way, it is possible to change the working distance by simple rotating of the lens device.

In a refinement of the lens device, provision can be made for all area segments of the same ring region to have the same first angle in the direction of the central axis at the first end and the same second angle in the direction of the central axis at the second end, in particular wherein the respective first angles of the ring regions are different from one another and the respective second angles of the ring regions are different from one another.

In this way, it is possible to pass through a complete angle range between the smallest angle and the largest angle over each area segment and the entire longitudinal extent of the area segment along the circumferential direction can be used for forming the surface of the area segment for converting the smallest angle into the largest angle.

In a further refinement of the lens device, provision may be made for the area segments of a respective ring region to be arranged immediately adjoining one another.

In particular, this may be provided if a ring region is a completely closed ring. However, provision may also be made for the area segments not to immediately adjoin one another. By way of example, a gap is then formed between neighboring area segments.

In a further refinement of the lens device, provision may be made for each area segment to be embodied with a continuous transition in the circumferential direction from the first angle to the second angle, in particular wherein the second angle is greater than the first angle.

A continuous transition between the first angle and the second angle simplifies controlling of the rotating of the lens device in order to set the desired acting refractive angle of the lens device in relation to the central axis.

In a further refinement of the lens device, provision may be made for the continuous transition to extend in a continuously increasing and/or linear fashion from the first angle to the second angle.

A continuous linear transition from the first angle to the second angle however further simplifies possible controlling of the rotating of the lens device. Moreover, such a transition is more easily producible from a manufacturing point of view.

In a further refinement of the lens device, provision may be made for at least one ring region to be a completely closed ring and/or for at least one ring region to be a portion of a ring.

Hence, a ring region need not move completely or through 360° around the central axis. In fact, a ring region may also be only a portion or segment of a closed ring. This always also depends on the type and arrangement of the illumination arrangements. By way of example, provision may be made for the illumination arrangements not to be distributed uniformly about the circumference. By way of example, provision may also be made for a number of illumination arrangements to be arranged in semi-circular fashion at a first radial distance from the central axis and for a second number of illumination arrangements to be arranged in semi-circular fashion at a second radial distance which differs from the first radial distance. Then, for example, it would only be necessary for a ring region to be only a portion of a ring that extends through 180°. Then, such a ring region would be arranged at the first radial distance and a further ring region would be arranged at the second radial distance. Alternatively, despite all of this, provision could naturally also be made for two ring regions at different radial distances, said ring regions each being a completely closed ring.

In a further refinement of the lens device, provision may be made for each ring region to be a completely closed ring.

Hence, in this refinement, either provision is made of a single ring region which is a completely closed ring or provision is made of a plurality of ring regions which are arranged concentrically about the central axis at different radial distances.

Moreover, a refinement of the lens device can consequently be provided in that the lens device comprises a plurality of ring regions which are arranged concentrically about the central axis.

Here, each ring region may be a completely closed ring. A plurality of area segments is provided in each ring region. Then, the area segments may be arranged immediately adjoining one another or neighboring one another with a gap therebetween. In particular, provision may be made for a plurality of ring regions to be provided, said ring regions being completely closed rings with area segments that immediately adjoin one another. Since the surfaces with which the area segments abut against one another are not optically effective surfaces, it is possible, for example, to manufacture the area segments individually and then combine these to form the ring regions and combine the ring regions to form the completed lens device. By way of example, the area segments may be scattered on one another. Adhesive bonding is also conceivable.

In a further refinement, provision can be made for the lens device to be integral.

Naturally, instead of individually manufacturing the area segments which are then connected to one another, it is also possible to embody the entire lens device in an integral manner. The desired extent of the light-exit surface can be provided by grinding and polishing.

In a further refinement of the lens device, provision may be made for the lens device overall to have the form of a closed ring which is arranged around the central axis.

Hence, the lens device in this case is made from at least one ring region or a plurality of ring regions, each of which is a completely closed ring.

In a further refinement of the lens device, provision may be made for an absolute value of the first angle of at least one of the ring regions, in particular of all ring regions, to lie in a range of 0° to 44.9° inclusive and an absolute value of the second angle of at least one of the ring regions, in particular of all ring regions, to lie in a range of 20° to 90° inclusive, in particular wherein the absolute value of the first angle of at least one of the ring regions, in particular of all ring regions, lies in a range of 5° to 19.9° and the absolute value of the second angle of at least one of the ring regions, in particular of all ring regions, lies in a range of 20° to 45°.

In particular, the absolute value of the first angle may also lie in a range of 5° to 15°, 5° to 10°, 7.5° to 15°, or 7.5° to 12.5°. In particular, the first angle may be 5°, 7.5°, 10°, 12.5°, 15°, 17.5°, 5°, 6°, 7°, 8°, 9°, 10°, 11°, 12°, 13°, 14°, 15°, 16°, 17°, 18°, or 19°. In particular, the second angle may lie in a range of 20° to 40°, 20° to 35°, 25° to 35°, 25° to 45°, or 30° to 45°. In particular, the second angle may be 20°, 25°, 30°, 35°, 40°, 45°, 27.5°, or 32.5°. In principle, the second angle may also lie in a range of 45° to 80° or 45° to 85°. Consequently, the upper limit of each range may also lie at 80° or 85° instead of at 75°.

In a further refinement of the lens device, provision may be made for the lens device to comprise a free central region radially within the at least one ring region. The free central region may also be referred to as "cutout" or "free space".

Hence, radiation may pass through the lens device to the optical sensor in this free central region without being refracted in the process.

In a further refinement, provision can be made for each area segment to be embodied as a free-form surface.

Here, a free-form surface is understood to mean a surface extent that has no symmetries. By way of example, such a free-form surface arises if the transition from the first angle to the second angle is provided in a continuously linear manner by rotating the surface.

In a further refinement of the lens device, provision may be made for at least one of the area segments, in particular all of the area segments, to have a Fresnelized embodiment.

Consequently, it is possible for at least one lens segment, or all lens segments, to be embodied in the style of a Fresnel lens or in a Fresnelized manner. Here, the light-entry surface or the light-exit surface may have a Fresnelized embodiment. In this way, the lens device in particular can be embodied with a smaller thickness. The first angle or the second angle then is the acting angle or effective angle of the prismatic deflection of the lens segment in the direction of the central axis.

In a further refinement of the illumination assembly, provision may be made for the illumination assembly to have a plurality of illumination arrangements, and an illumination arrangement is assigned to each area segment.

In this way, it is possible to provide a plurality of illumination arrangements, for example illumination arrangements distributed over the circumference. Each area segment acts for an illumination arrangement, and so the lens device is used to the best possible extent.

In a refinement of the illumination assembly, the illumination arrangement may comprise a light source, in particular an LED (light-emitting diode), or provision can be made for the illumination arrangement to be a light-exit surface of a light-source guide.

As a matter of principle, the "illumination arrangement" is not necessarily an illumination arrangement with a light source. In principle, any individual light-exit surface should be understood to be the illumination arrangement. The illumination arrangement of the illumination assembly may comprise a dedicated light source. However, in principle, an external light source may also be provided in the coordinate measuring machine and the light radiation becomes the light-emitting element of the illumination arrangement via the light-source guide. Therefore, this may be an active illumination arrangement, i.e. an illumination arrangement comprising a dedicated light source, or a passive illumination arrangement, i.e. an illumination arrangement which is fed by an external light source not belonging to the illumination arrangement. As a rule, an illumination arrangement will also comprise a collimator in addition to the light-emitting element before the light is incident on the lens device. This causes collimated light radiation to be incident on the lens device or be incident on the light-entry surface there. Naturally, other light sources are also conceivable in addition to LEDs, for example OLEDs, lasers, any type of white-light source or sources emitting other types of light radiation.

In a further refinement of the illumination assembly, provision may be made for the illumination assembly moreover to comprise a drive device for rotating the lens device about the central axis relative to the at least one illumination assembly. Provision may be made of at least one drive device. In particular, provision may also be made of a plurality of drive devices which, for example, are distributed uniformly over the circumference. Here, the drive device may rotate the lens device by way of example by force fit by way of wheels which are in contact with the lens device. Other connections may also be provided in order to avoid a loss of step due to slip. By way of example, the lens device may be held by teeth and these teeth may engage with the drive device either directly or indirectly.

In a further refinement of the method, provision may be made for the lens device to comprise a light-entry surface and a light-exit surface, wherein the lens device comprises at least one ring region, wherein each ring region extends along a circumferential direction about a central axis of the lens device, wherein each ring region comprises a plurality of area segments, wherein each area segment forms a of a respective ring region and wherein each area segment comprises a first end in the circumferential direction and a second end opposite to the first end in the circumferential direction, wherein, at the first end, the light-exit surface is inclined in the direction of the central axis by an arbitrary first angle in relation to the light-entry surface and wherein, at the second end, the light-exit surface is inclined in the direction of the central axis by an arbitrary second angle in relation to the light-entry surface, said second angle differing from the first angle.

In this way, the method is provided with a lens device in accordance with the first aspect, facilitating a cost-effective and simple implementation of the method.

It goes without saying that the aforementioned features and those yet to be explained below can be used not only in the combination specified in each case but also in other combinations or on their own, without departing from the scope of the present invention.

BRIEF DESCRIPTION OF THE SEVERAL VIEWS OF THE DRAWING

Embodiments of the invention are shown in the drawing and explained in more detail in the following description. In the figures:

FIG. 9a shows a lens device in a first position in relation to a plurality of illumination arrangements, FIGS. 10a-10c show a procedure for rotating a lens device in relation to a plurality of illumination arrangements.

DETAILED DESCRIPTION OF THE INVENTION

Figure 1:
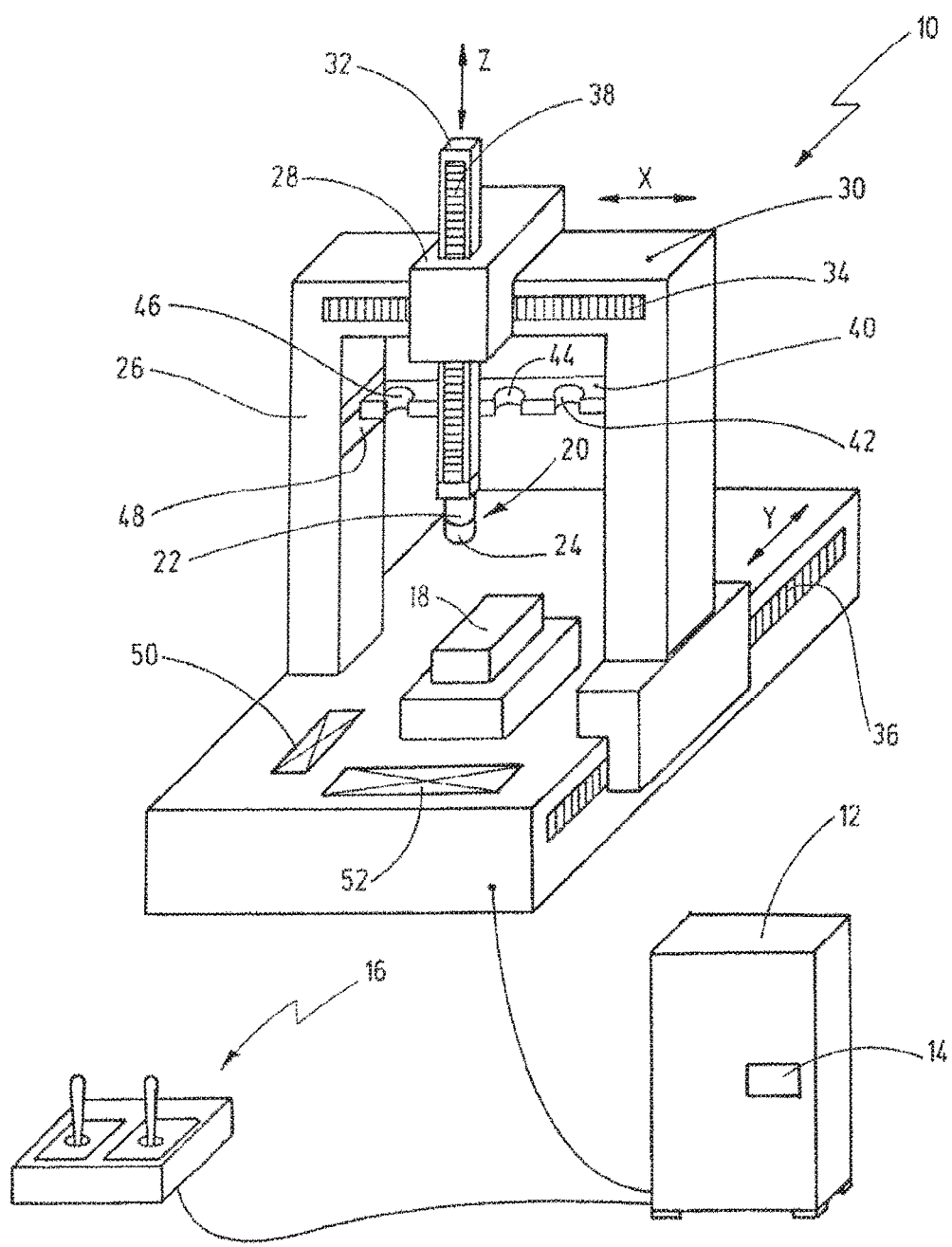
FIG. 1 shows an embodiment of a coordinate measuring machine.

FIG. 1 shows an embodiment of a coordinate measuring machine 10. The coordinate measuring machine 10 comprises a regulating device 12 which is embodied to control the coordinate measuring machine 10 in an automated manner. To this end, the regulating device 12 may comprise a data processing unit 14. Moreover, the regulating device 12 may also comprise indication apparatuses which indicate information items about selected modes of operation, measurement results, etc. to a user of the coordinate measuring machine 10. Moreover, the coordinate measuring machine 10 comprises an operating device 16 which allows a user to control the coordinate measuring machine 10. Here, the operating device 16 is only depicted schematically. On the one hand, this should facilitate manual movement of the coordinate measuring machine 10. Moreover, the operating device 16 may be embodied to allow the user to enter system inputs into the regulating device 12 in order to select a mode of operation, etc. Moreover, the regulating device 12 may also automatically regulate the coordinate measuring machine 10.

The coordinate measuring machine 10 serves to measure a workpiece 18. To this end, the coordinate measuring machine 10 comprises an optical sensor head 20, the latter comprising an optical sensor 22 and an illumination assembly 24. The illumination assembly 24 is coupled to the optical sensor 22.

In order to be able to move the optical sensor head 20 relative to the workpiece 18, the coordinate measuring machine comprises a portal 26 in the embodiment depicted here, said portal being movable in a Y-direction. A carriage 28 is mounted in a manner movable in an X-direction at a crossbeam 30 of the portal 26. In this way, the optical sensor head 20 may be moved in the X-direction by moving the carriage 28 on the crossbeam 30. A quill 32 is provided in the carriage 28, said quill being movable relative to the carriage 28 in a Z-direction. Then, the optical sensor head 20 is attached to the quill 32. In this way, it is possible to move the optical sensor head 20 in all three spatial directions X, Y and Z. A mount of the portal 26, the carriage 28 and the quill 32 relative to one another may, for example, be embodied by means of so-called air bearings. The coordinate measuring machine 10 may have scales in order to capture the location of the portal 26, the carriage 28 and the quill 32. By way of example, provision may be made of a scale 34 for the X-direction, a scale 36 for the Y-direction and a scale 38 for the Z-direction.

Moreover, the coordinate measuring machine 10 may comprise a holding device 40. At least one storage space is provided, in particular a plurality of storage spaces are provided, in the holding device 40. A first storage space 42, a second storage space 44 and a third storage space 46 are depicted. Each storage space 42, 44, 46 may be provided to carry a specific illumination assembly 24. Interchanging of an illumination assembly 24 may then be carried out, for example, in such an automated manner that the regulating device 12 puts down a currently coupled illumination assembly 24 into one of the storage spaces 42, 44, 46 and picks up a further illumination assembly (not depicted here) from another storage space 42, 44, 46.

In the embodiment depicted here, the holding device 40 is attached to the portal 26 such that the holding device 40 extends below the crossbeam 30 and parallel to the crossbeam 30 in the X-direction. Alternatively, provision may, for example, also be made for the holding device 40 to be attached directly to the crossbeam 30. Travel paths for interchanging an illumination assembly 24 may be kept particularly short by an appropriate arrangement of the holding device 40. However, as is visible from the depicted view, there is initially no option for displacing the optical sensor 22 and the holding device 40 relative to one another in the Y-direction in the depicted arrangement. Hence, in the illustrated embodiment, the holding device 40 is mounted on a carriage 48 in the portal 26 such that relative movement of the holding device 40 in the Y-direction in relation to the optical sensor 22 becomes possible. Here, the holding device 40 is moved relative to the portal 26 of the carriage 48 in the Y-direction.

Naturally, alternative arrangements of the holding device 40 are moreover conceivable. By way of example, it is possible for the holding device 40 to be positioned at the schematically indicated setup points 50, 52. Then, it stands freely in the coordinate measuring machine 10. Then, the storage spaces 42, 44, 46 may be approached freely by the optical sensor 22 in order to put down or pick up an illumination assembly 24.

Figure 2:
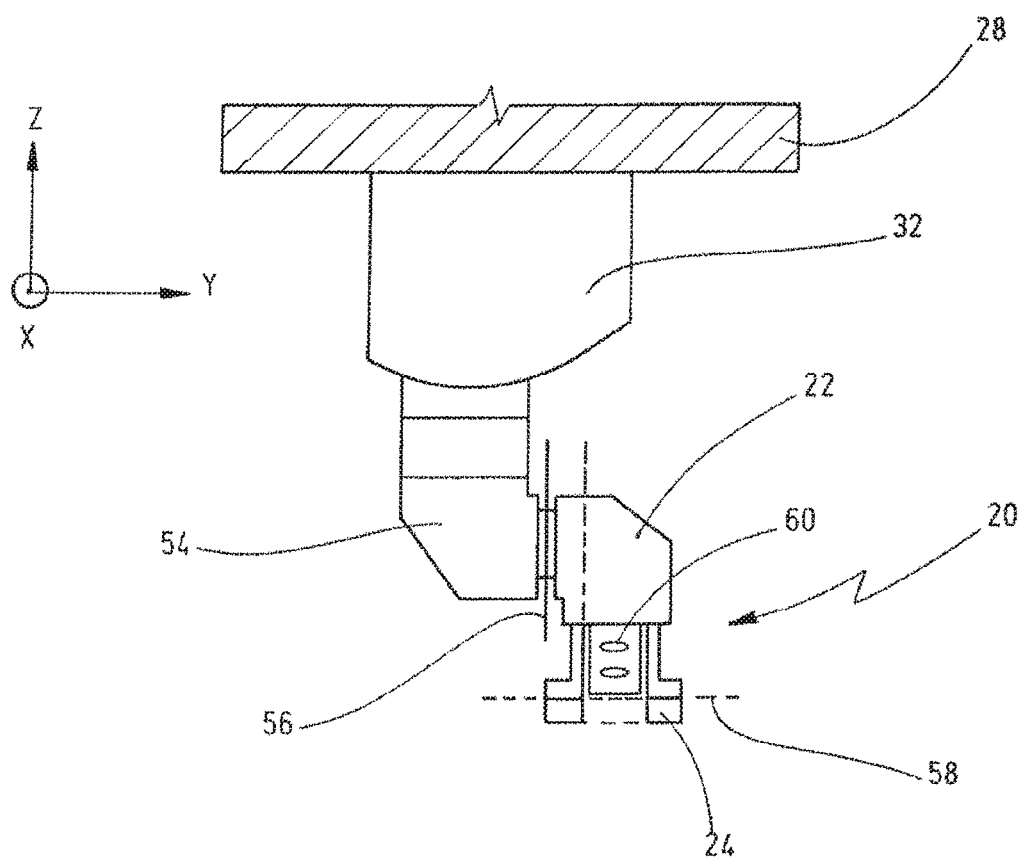
FIG. 2 shows a side view of an optical sensor of the coordinate measuring machine comprising an illumination assembly.

FIG. 2 shows a schematic detailed view of part of the coordinate measuring machine 10. Once again, the carriage 28 and the quill 32 are depicted in a schematic manner. As may be gathered from FIG. 2, e.g. a so-called articulation unit 54 may be arranged on the quill 32, said articulation unit facilitating a rotation of the optical sensor 22 about two axes, in particular about e.g. both the Z-direction and the Y-direction in the depicted embodiment. In this way, the optical sensor 22 may be aligned in a multiplicity of directions in order to observe the workpiece 18 from a desired observation angle. Here, various system components are coupled by way of interchange surfaces 56; by way of example, the optical sensor 22 is coupled to the articulation unit 54 by means of an interchange surface 56. Electrical supply lines, communication interfaces, optical interfaces, etc., are provided over the interchange surface 56 in order, firstly, to supply the optical sensor 22 with power and, secondly, to be able to irradiate the workpiece 18. Furthermore, the data captured by the optical sensor 22 are guided over the interchange surface 56 and the interfaces provided there to the regulating device 12 and the data processing unit 14 thereof.

The illumination assembly 24 is coupled to the optical sensor 22 along a first interface device 58. In the depicted embodiment, the illumination assembly 24 has the form of a circular ring. Moreover, the optical sensor 22 also comprises an imaging optical unit 60 which serves to image light radiation received by a workpiece 18 onto the optical sensor 22.

The configuration of the illumination assembly 24 is explained below in view of the further figures.

Figure 3:
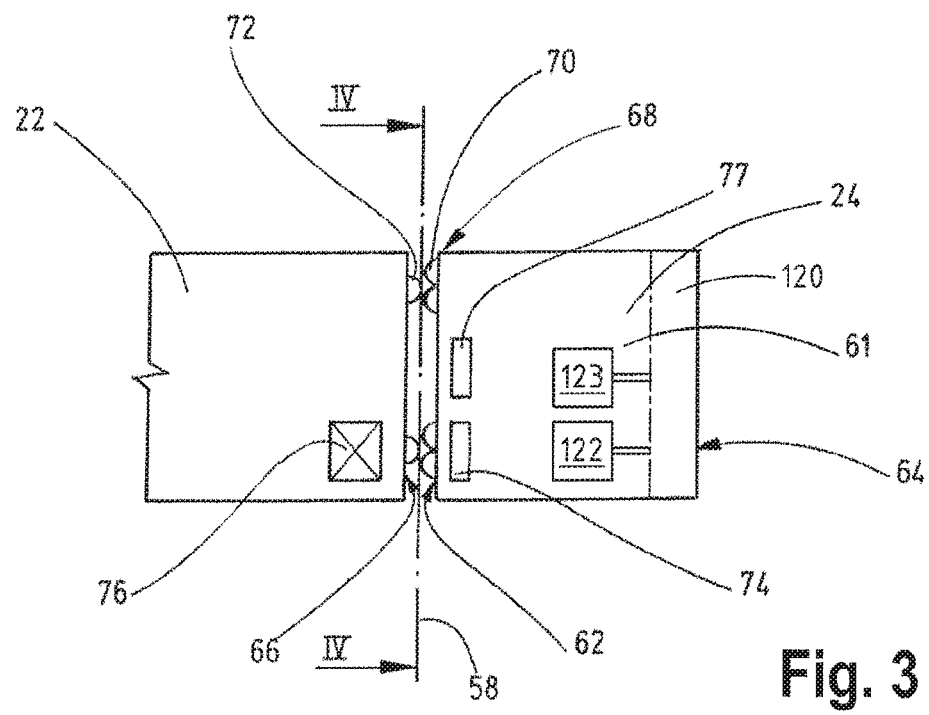
FIG. 3 shows a magnified view of an illumination assembly coupled to an optical sensor.

FIG. 3 schematically depicts the illumination assembly 24. It is coupled to the optical sensor 22. The illumination assembly 24 comprises a main body 61. The main body 61 in turn comprises a sensor side 62 which faces the optical sensor 22. Opposite the sensor side 62, the main body 61 comprises a workpiece side 64, which faces the workpiece 18 during operation. By way of example, in the coupled state, the sensor side 62 of the main body 61 lies opposite a coupling side 66 of the sensor 22. Moreover, the illumination assembly 24 comprises a lens device 120 which is still explained in more detail below. Moreover, provision may be made of a drive device 122 which is embodied to rotate the lens device 120, in particular relative to at least one illumination arrangement. Moreover, provision may be made of a drive device 123 which is embodied to move at least the lens device 120 and/or further elements of the illumination assembly relative to the imaging optical unit 60 in a manner parallel to an optical axis of the imaging optical unit and/or parallel to the central axis 124. In this way, an optical working distance may be maintained and an angle of incidence of the illumination radiation in relation to the central axis may be modified.

A three-point bearing 68 is provided for coupling the coupling side 66 of the optical sensor 22 and the sensor side 62 of the main body 61. In terms of the principles thereof, such a three-point bearing is known to a person of average skill in the art and it serves to couple the illumination assembly 24 in an unambiguous position in relation to the optical sensor 62. To this end, three-point bearing elements 68 are provided at the sensor side 62 of the illumination assembly 24 and three-point bearing elements 72 are provided at the coupling side 66 of the optical sensor 22. By way of example, here, provision is made for a bearing by way of ball pairs, ball-roller pairs or a bearing in depression for the first ball, a bearing in a V-groove for the second ball and a bearing on a surface for the third ball of the three-point bearing.

In order to apply the necessary holding force which holds the illumination assembly 24 and the optical sensor 22 together, provision may be made for a permanent magnet 74 to be provided in the main body 61. Here, the permanent magnet 74 is arranged in such a way that the magnetic field lines extend through the optical sensor 22 via the first interface device 58 such that a suitable holding force is provided between the illumination assembly 24 and the optical sensor 22. Naturally, the magnetic field lines must extend through a ferromagnetic material in the optical sensor 22 in the process. A further permanent magnet or an electromagnet (not depicted here) may also be present in the optical sensor in order to apply the necessary holding force together with the permanent magnet 74. Naturally, provision may additionally also be made for additional permanent magnets to be provided in the illumination assembly 24 and/or in the optical sensor 22. Naturally, provision may also be made for the permanent magnet 74 to be provided only in the optical sensor 22.

Moreover, provision may be made for the optical sensor 22 to comprise a switchable electromagnet 76. Here, it is configured in such a way that it at least partly neutralizes a magnetic field applied by the permanent magnet 74, and so the illumination assembly 24 may be separated more easily from the optical sensor 22. Naturally, provision may also be made for one or more electromagnets to be arranged in the illumination assembly 24. In order to be able to avoid the necessity of supplying energy to the illumination assembly 24, the electromagnet may be provided in the optical sensor 22.

Moreover, a power reception device 77 may also be provided in the illumination assembly 24, said power reception device being coupled to the optical sensor 22 via the first interface device 58, either in a wireless or in a wired manner, such that the illumination assembly 24 is provided with a power supply.

Figure 4:
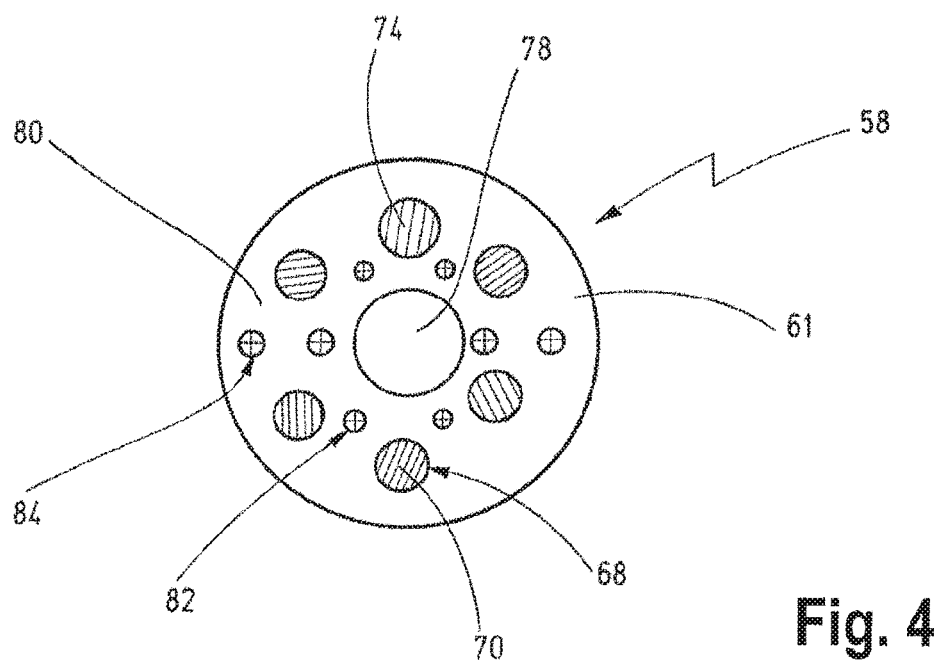
FIG. 4 shows a section along the line IV-IV in FIG. 3, FIGS. 5a-5c show various embodiments of an illumination assembly.

FIG. 4 shows a cross-sectional view along a line IV-IV in FIG. 3.

As may be identified in the cross section of FIG. 4, the main body 61 has the shape of an annulus. Expressed differently, the main body 61 substantially has the form of a cylinder with a central cutout. In this respect, the main body 61 of the illumination assembly 24 comprises a free central region 78, which forms the cutout. Moreover, the main body 61 comprises an edge region 80. In the depicted view, the lens device 120 is covered by the main body 61. Then, the edge region 80 comprises the first interface device 58 with, in the depicted embodiment, e.g. three permanent magnets 74 and further optical interfaces 82 for guiding light from the optical sensor 22 into the illumination assembly 24, and electrical interfaces 84 for supplying the illumination assembly 24 with power. In FIG. 4 and the subsequent figures, the three-point bearing is only depicted in a schematic manner.

Naturally, the embodiment depicted in FIG. 4 should merely be understood to be exemplary. By way of example, an illumination assembly 24 only comprising passive illumination arrangements may also have no electrical interfaces 84 in the edge region 80. Furthermore, it is possible that an illumination assembly 24 only comprising active illumination arrangements comprises no optical interfaces 82 in the edge region 80.

Figure 5A:
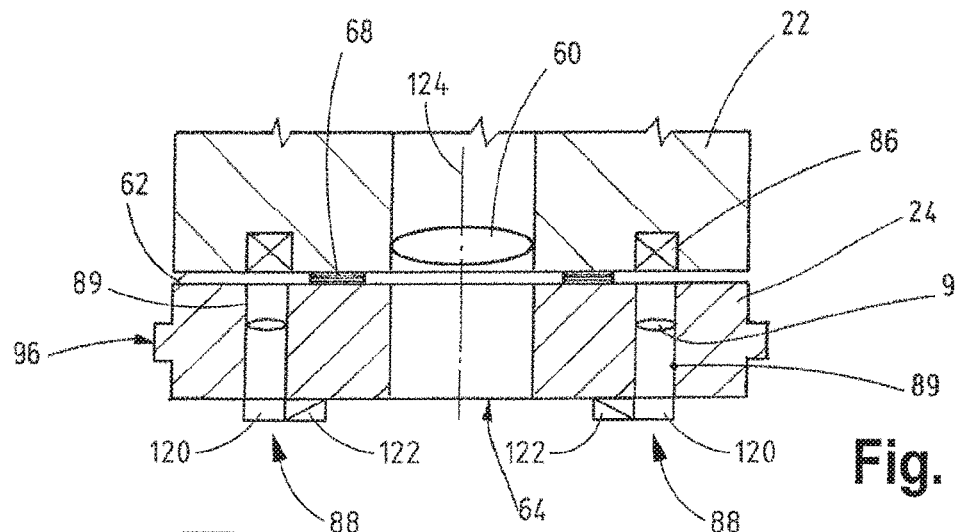

A first embodiment of an illumination assembly 24 is depicted in an exemplary manner in FIG. 5a. Identical elements are identified by the same reference symbols and will not be explained again below.

In the depicted embodiment, the optical sensor 22 comprises at least one light source 86. By way of example, the light sources 86 may be embodied as a plurality of punctiform light sources, for example as LEDs or OLEDs or lasers, which have a ring-shaped arrangement, in particular which are distributed uniformly over the circumference of a central axis 124.

The illumination assembly 24 comprises a plurality of illumination arrangements 88. The illumination arrangements 88 have merely a passive embodiment. By way of example, the illumination arrangements 88 each comprise an optical waveguide 89 and each may moreover comprise optical elements 90, for example refractive optical elements, diffractive optical elements, reflecting optical elements and/or holographic optical elements. However, this is not necessarily the case. Arbitrary combinations of such optical elements are conceivable for providing a desired illumination by means of the illumination arrangement 88. Moreover, a plurality of illumination arrangements arranged in a rotationally symmetric or circular manner are naturally also conceivable in place of an optical waveguide 89; here, the illumination arrangements may be active or passive. The light emitted by the light source 86 is coupled into the optical waveguide 89, guided through the illumination assembly 24 and deflected as desired such that, ultimately, a suitable illumination of the workpiece 18 is provided by means of the illumination assembly 24. Moreover, the illumination assembly 24 comprises an interchange interface device 96 which, in the depicted embodiment, is embodied as a circumferential projection. Then, the circumferential projection may, for example, interact with a circumferential groove in a storage space 42, 44, 46 of the holding device 40 such that, for example, the illumination assembly 24 may then be pushed into such a storage space.

Figure 5B:
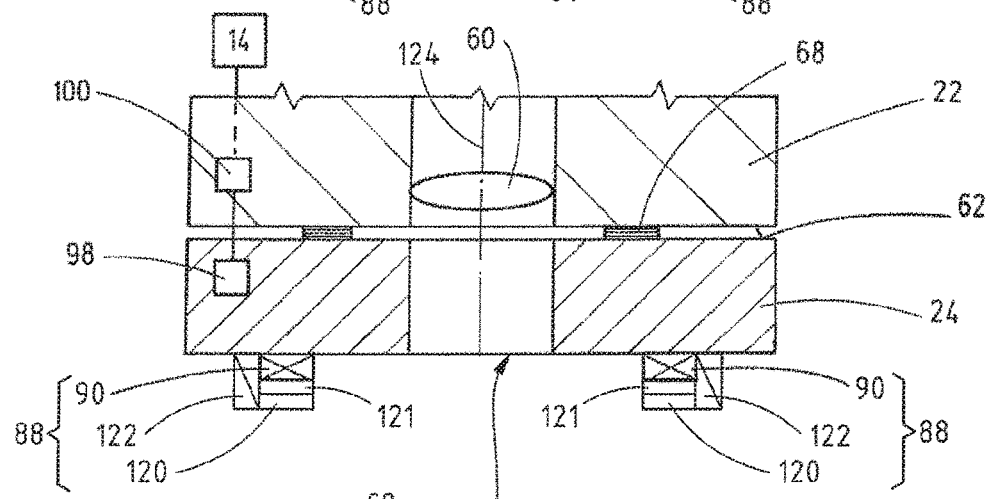

A further embodiment of an illumination assembly 24 is depicted in FIG. 5b. Again, the same elements are denoted by the same reference signs. Therefore, only the differences are discussed.

The illumination assembly 24 comprises an identifying device 98 which may be read by an identification reading device 100. Here, reading may be carried out in a wired or else wireless manner. The identification reading device 100 may be arranged in the optical sensor 22. However, it may also be arranged in any other element of the coordinate measuring machine 10. It may also directly be part of the regulating device 12 or the data processing unit 14. In this way, it is possible to uniquely identify the illumination assembly 24 and provide this information item to the regulating device 12. Firstly, this serves to identify the coupled illumination assembly 24 and the illumination type thereof, and secondly, for example, it is also possible for dimensions of the illumination assembly 24 to be stored in the identifying device 98 and for these to be read out in order, in this way, to facilitate a collision-free regulation of a movement of the optical sensor 22 coupled to the illumination assembly 24.

In the depicted embodiment, the illumination assembly 24 is configured as a so-called active illumination assembly. It comprises two light sources 102, and so the illumination assembly 24 in FIG. 5b comprises two illumination arrangements 88.

In particular, the light source 102 may be embodied using energy-saving LED/OLED technology or as a laser. By way of example, the light sources 102 may be used in groups, separated according to colors, in a continuous wave operation or in a pulsed operation. If many different light sources are intended to be used, it is advantageous to provide a control device directly in the illumination assembly 24. Accordingly, an electrical interface for supplying such a control device with power and control signals should be provided by way of the first interface device 58. Here, the supply with electrical power may have a wireless or wired embodiment. In particular, provision may moreover be made for an energy supply for a control device and an energy supply for the light sources 102 to have embodiments that are separate from one another. Moreover, provision may be made of collimators 121 for collimating the emitted light before incidence on the lens device 120.

Figure 5C:
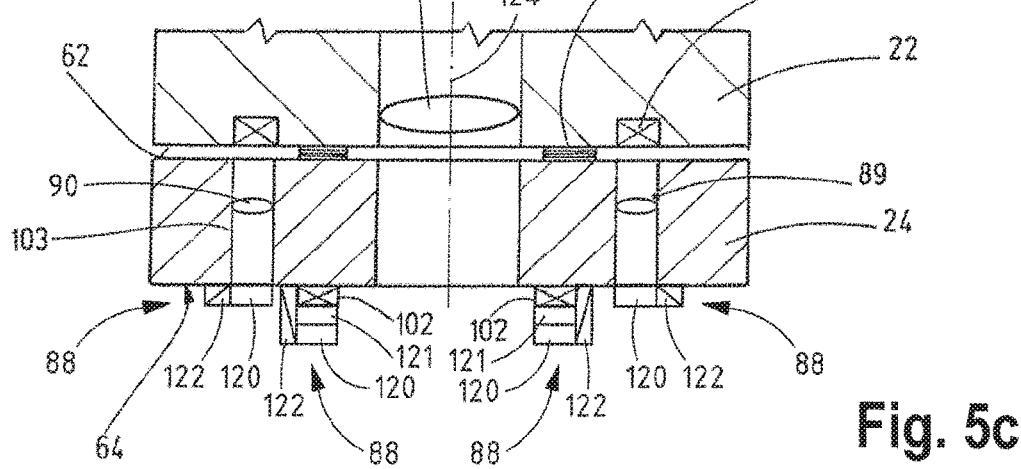

An even further embodiment of an illumination assembly 24 is depicted in FIG. 5c. The illumination assembly 24 in FIG. 5c comprises both active and passive illumination arrangements 88 in combination. By way of example, in the depicted example, two illumination arrangements 88 are provided only by means of two optical waveguides 89, 103, which guide the light emitted by a light source 86 of the optical sensor 22 through the illumination assembly 24. Furthermore, two illumination arrangements 88, which are respectively provided as active light-emitting light sources 102, are provided in a supporting role.

Hence, the illumination assembly 24 according to the invention may comprise passive illumination arrangements, active illumination arrangements or both active and passive illumination arrangements 88.

Figure 6A:
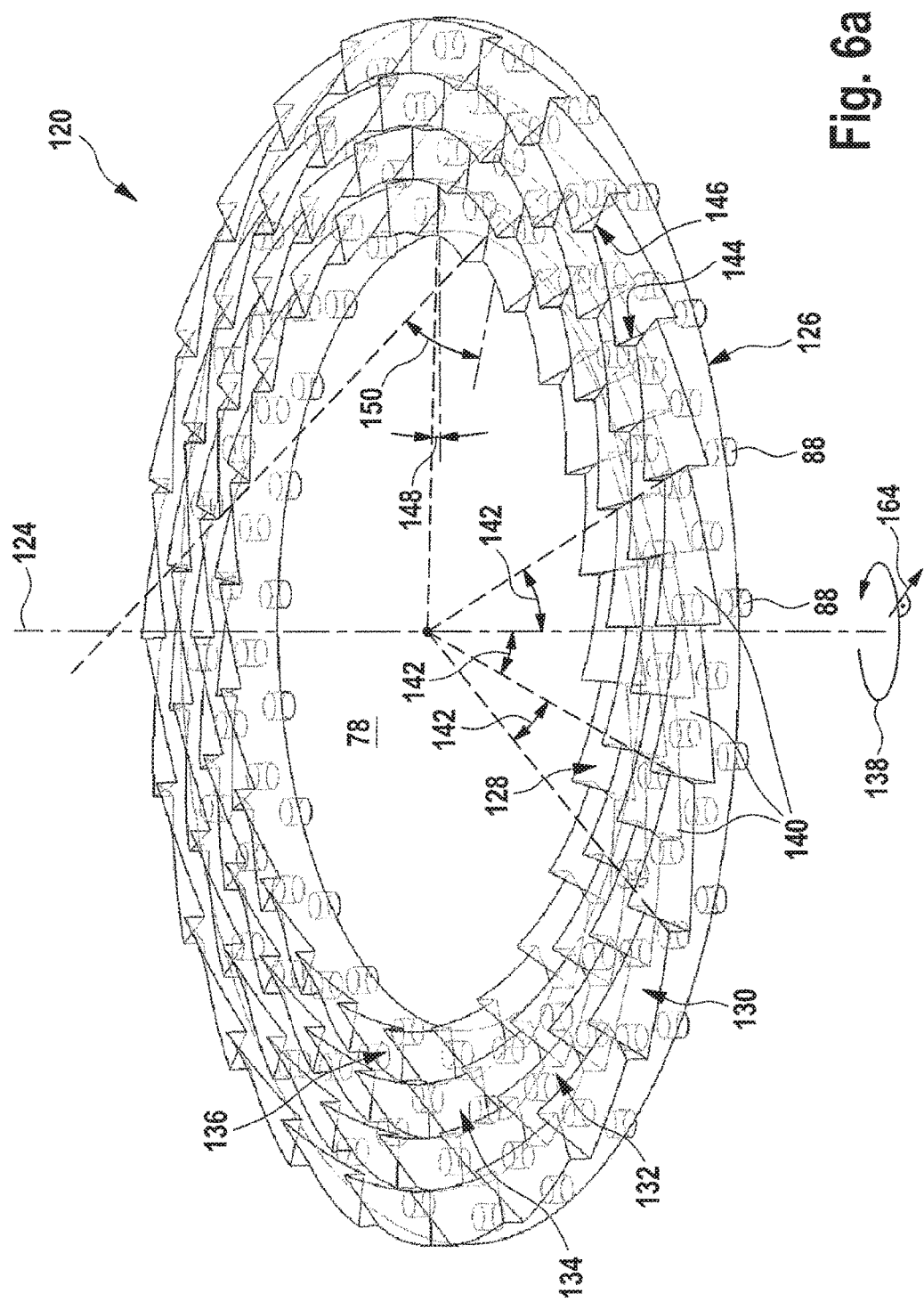
FIG. 6a shows an isometric view of an embodiment of a lens device.

FIG. 6a shows an embodiment of a lens device 120. The depicted lens device 120 extends in a ring-shaped manner about a central axis 124. The lens device 120 comprises a light-entry surface 126 and a light-exit surface 128. The light-entry surface 126 and the light-exit surface 128 are the optically effective surfaces of the lens device 120. In the depicted embodiment, the lens device 120 comprises four ring regions 130, 132, 134 and 126. In general, the lens device 120 comprises at least one ring region 130. Each ring region 130 to 136 may be only a portion of a completely closed ring or a completely closed ring. All four ring regions 130 to 136 are completely closed rings in the depicted embodiment. The ring regions 130 to 136 extend concentrically around the central axis 124 at different radial distances. A circumferential direction around the central axis 124 is denoted by 138. Each ring region extends around the central axis 124 in the circumferential direction 138.

Each ring region 130 to 136 comprises a plurality of area segments 140. Each area segment 140 forms a circular arc portion 142 of a respective ring region. By way of example, if a completely closed ring region, in which the area segments 140 are arranged immediately adjoining one another, comprises a total of 24 area segments, each one of these area segments extends over an angle of arc of 15°. However, this should merely be understood to be exemplary. Naturally, other subdivisions may also be undertaken.

Accordingly, each area segment 140 has a first end 144 and a second end 146 in the circumferential direction 138. At the first end 144 of each area segment 140, the light-exit surface 128 is inclined in the direction of the central axis 124 by an arbitrary first angle 148 in relation to the light-entry surface 126. Thus, this angle or inclination angle is the angle which the light-exit surface at the first end 144 includes with the central axis 124 in an imaginary line within a plane containing the central axis 124. If the angle is 90°, the light-exit surface is perpendicular to the central axis 124 at the first end. If the angle is 0°, the light-exit surface extends parallel to the central axis 124 at the first end 144. A corresponding statement naturally applies for the second end 146. At the second end 146, the light-exit surface 128 is inclined in the direction of the central axis 124 by an arbitrary second angle in relation to the light-entry surface 126, said second angle differing from the first angle 148. Consequently, at the first end 144 and the second end 146, the light-exit surface 128 of each area segment 140 is inclined in the direction of the central axis by different angles in relation to the light-entry surface 126. In particular, the light-exit surface 128 of each area segment does not have any curvature in a radial direction 164 that is perpendicular to the circumferential direction 138. As it were, the light-exit surface 128 is "twisted" in each area segment 140 from the first end 144 toward the second end 146, and so there is a transition from the first angle 148 to the second angle 150. In particular, this transition may have a continuous profile, in particular a linear profile.

In principle, the first angle 148 and the second angle 150 of each area segment 140 may be selected to be arbitrary. Thus, they can differ from one another for each area segment. However, in particular, provision is made for the area segments 140 of the same ring region within each ring region 130 to 136 to respectively have the same first angle 148 at their first end 144 and the same second angle 150 at their second angle 146. However, the respective first angles 148 and second angles 150 among the ring regions 130 to 136 may differ from one another. Such a setting may be expedient on account of the different radial distances from the central axis 124. However, provision may also be made for the first angles 148 respectively to be identical and also for the second angles 150 respectively to be identical for all ring regions 130 to 136 and in all area segments 140.

In particular, an illumination arrangement 88 may be assigned to each area segment 140. The illumination arrangement 88 may be "active", for example a light source such as an LED, OLED or a laser. In principle, further optical elements, such as collimators or the like, may be arranged in each case between the light source and the lens device. However, an illumination arrangement 88 may also be a "passive" illumination arrangement, for example the light-exit surface of an optical waveguide which supplies light from a light-emitting element situated at a distance. By way of example, provision may also be made for a plurality of optical waveguides to proceed from a single light-emitting element, said plurality of optical waveguides feeding the illumination arrangements 88.

Thus, an illumination arrangement 88 is assigned to each area segment 140. Now, it becomes possible to modify the angle through which the lens device 120 deflects the light from the illumination arrangements 88 in respect of the central axis 124 by rotating the lens device 120 about the central axis 124. By way of example, all illumination arrangements are arranged in the vicinity of the respective first end 144 of each area segment 140 in a first position. By rotating, it is possible to reach a second position, in which each illumination arrangement 88 is arranged in the vicinity of the respective second end 146 of an area segment 140. Thus, the first angle 148 acts in the first position and the second angle 150 acts in the second position. Different working distances may be illuminated in this way. Thus, for example, a dark field top light illumination may be adjusted in an ideal manner to a distance of an object to be measured. It is not necessary to change e.g. the illumination assembly when varying the working distance.

In the embodiment depicted in FIG. 6a, the entire angle range between the first angle 148 and the second angle 150 may be passed over by the illumination by way of rotating the lens device by at most 15°. In this way, it is also possible to pass over a corresponding illumination distance range and the reflected light illumination, in particular a dark field top light illumination, may be set as desired. The illumination may thus be adjusted finely for variable working distances, particularly in the case of a dark field top light illumination, which is very sensitive in relation to the set illumination distance or the angle of incidence in relation to the central axis 124. A single actuator which rotates the lens device 120 relative to the illumination arrangements 88 may be sufficient in this respect.

Figure 6B:
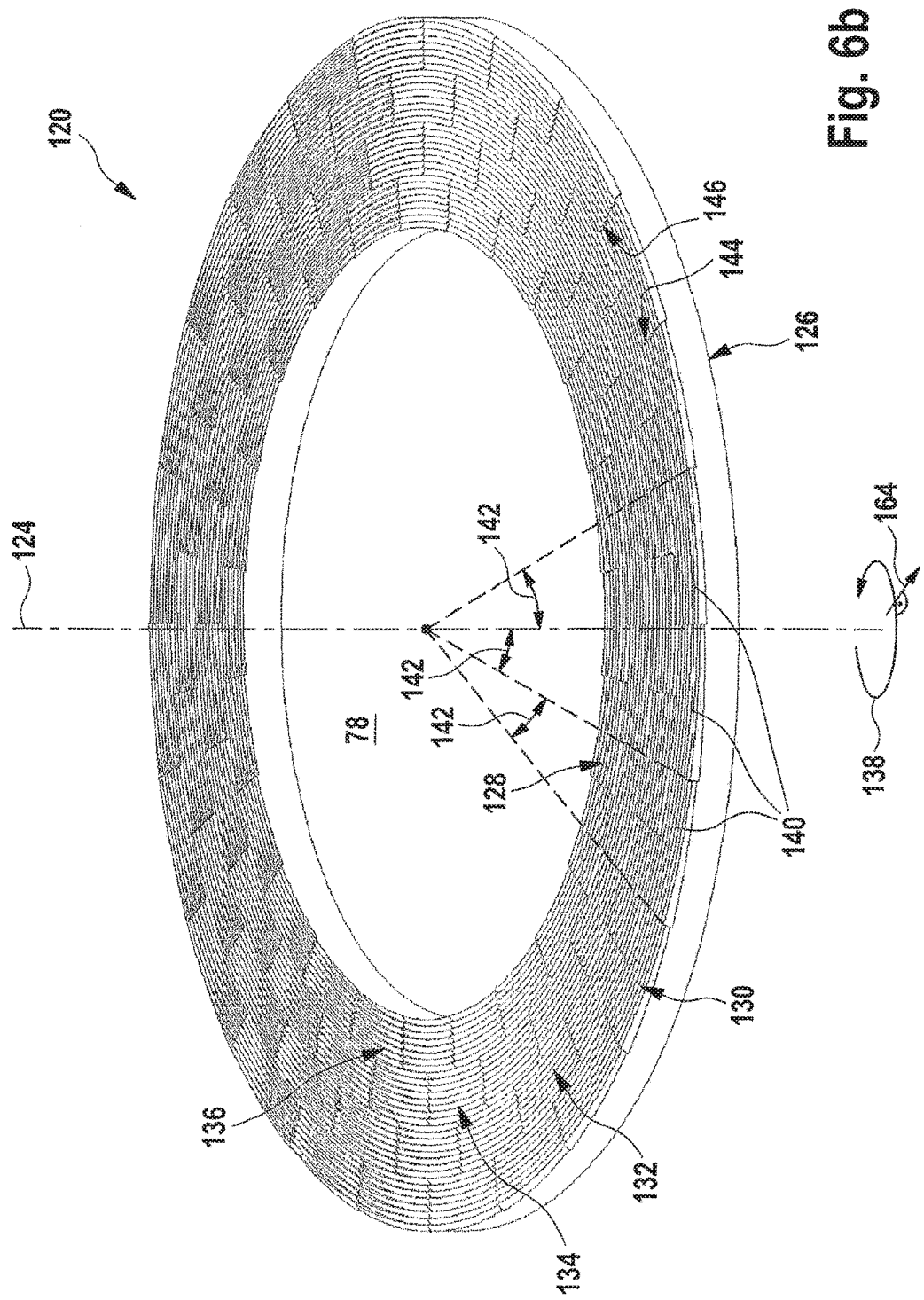
FIG. 6b shows an isometric view of a further embodiment of a lens device.

FIG. 6b shows a further embodiment of a lens device 120. Identical elements are denoted by the same reference symbols and will not be explained again. In this embodiment, each of the lens segments 140 is Fresnelized, i.e. embodied as a Fresnel lens. For this, the light-exit surface 128 is Fresnelized in the presented embodiment. In principle, it is alternatively or cumulatively also possible for the light-entry surface 126 to be Fresnelized.

Figure 7:
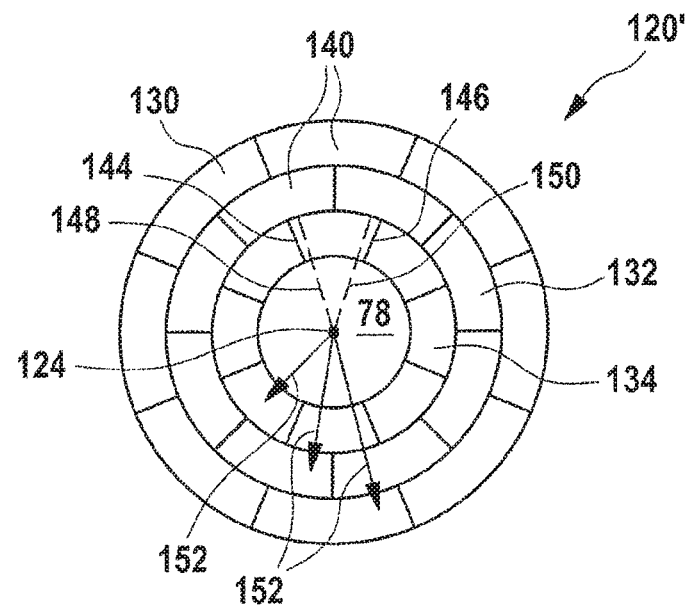
FIG. 7 shows a plan view of a schematic further embodiment of a lens device.

FIG. 7 shows a schematic plan view of a further embodiment of a lens device 120. The lens device comprises three ring regions 130, 132, 134. These extend concentrically around the free central region 78 around the central axis 124. The angles 148 and 150 are denoted schematically in a plan view. As can be seen, the angles at the first end 144 and the second end 150 extend in a plane that contains the central axis 124. The respective angle is the angle which the imaginary continuation of the light-exit surface 128 includes with the central axis 124. Ultimately, this angle within the plane containing the central axis 124 determines how strongly the light of the illumination arrangements 88 is refracted toward the central axis 124 and hence the illumination distance. In the plan view of FIG. 7, it is possible to identify that all area segments 140 immediately adjoin one another. This is the case in all three ring regions 130, 132, 134.

Figure 8:
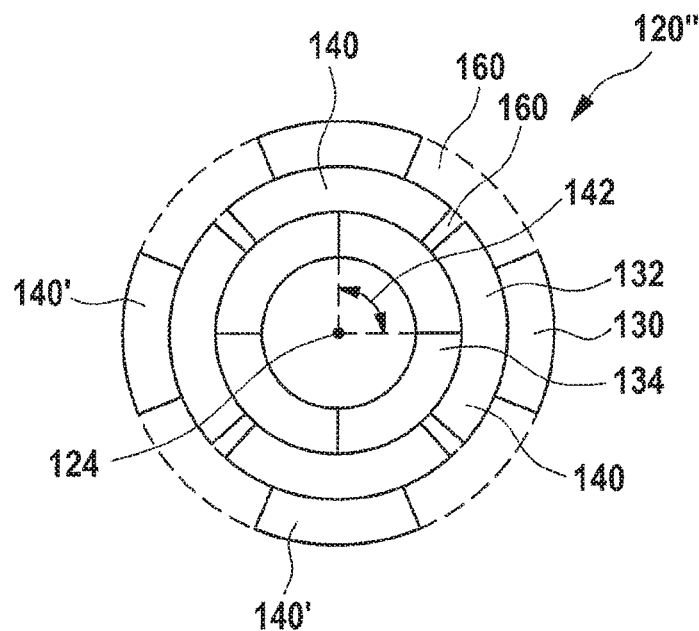
FIG. 8 shows a schematic plan view of an even further embodiment of a lens device.

FIG. 8 shows a further schematic plan view of a lens device 120". Only the differences are explained below; the same elements continue to be denoted by the same reference signs. The area segments are once again arranged immediately adjoining one another in the third ring region 134. However, the area segments are arranged with distances or gaps 160 therebetween in the first ring region 130 and the second ring region 132. Thus, a respective ring region 130 to 136 is then distinguished by the same radial distance 152 between the associated area segments 140. However, all ring regions are complete rings in the embodiment depicted in FIG. 8.

However, in some cases there may also be, for example, a nonsymmetrical arrangement of illumination arrangements 88. By way of example, it could be the case that only two illumination arrangements are provided at the respective radial distance 152 of the first ring region 130, said illumination arrangements being assigned to the area segments denoted by 140'. Then, the first ring region 130 would correspondingly only be a portion of a complete ring. However, the area segments 140' would continue to be arranged at the same radial distance 152 from the central axis 124.

Figure 9B:
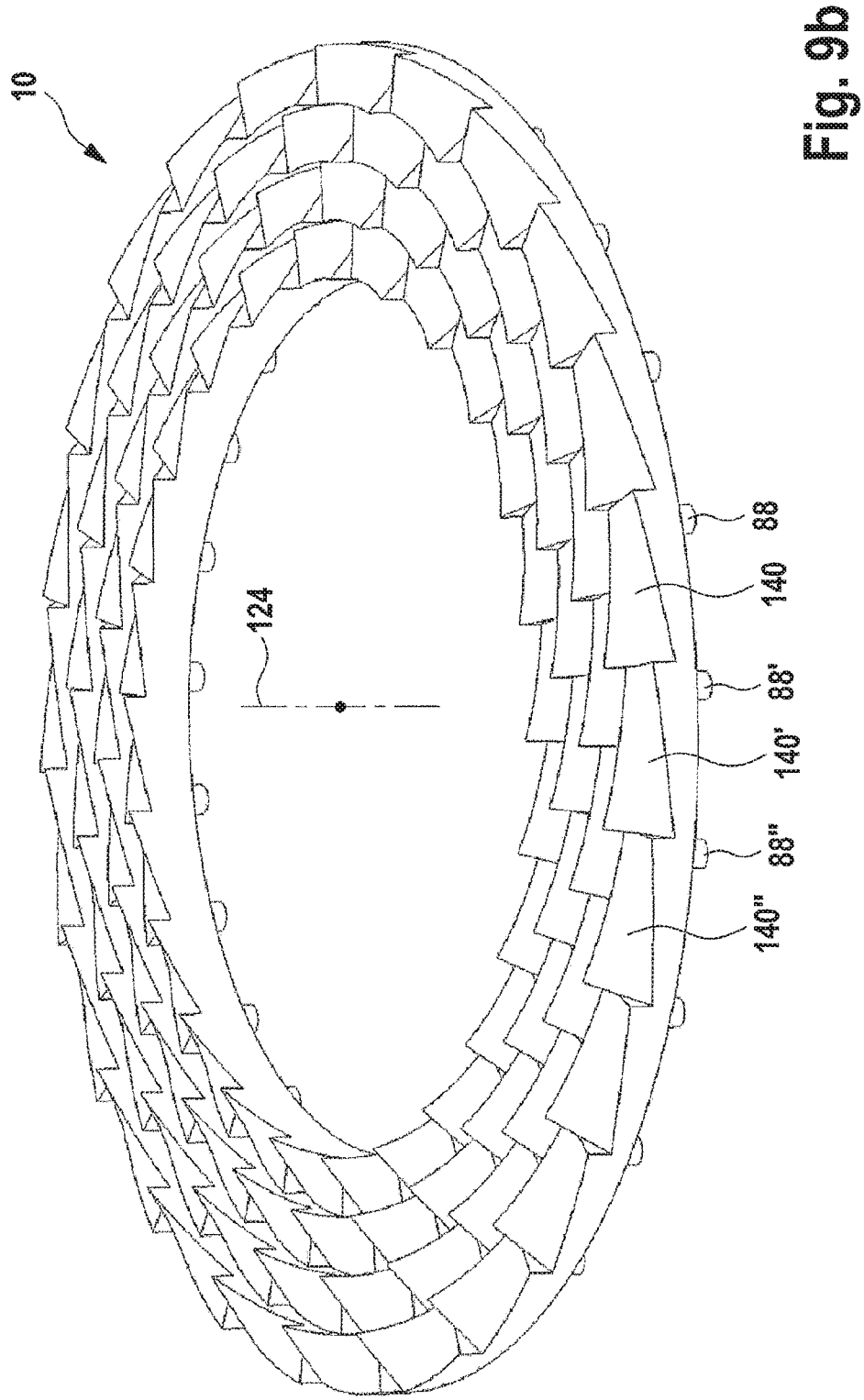
FIG. 9b shows the lens device from FIG. 9a in a second position in relation to the plurality of illumination arrangements.

FIGS. 9a and 9b once again visualize the rotation of the lens device 120 about the central axis 124. In FIG. 9a, the illumination arrangements are arranged in a first position relative to the lens device 120; in FIG. 9b, they are arranged in a second position. Three illumination arrangements 88, 88' and 88" with assigned area segments 140, 140' and 140" are labeled with reference signs in an exemplary manner. The corresponding elements are also labeled in FIG. 9b. The illumination arrangements 88 have a fixed arrangement. Accordingly, a rotation of the lens device 120 about the central axis 124 in the circumferential direction 138 in principle brings about a change in the effective refractive angle of the lens device 120. It changes from the first angle 148 to the second angle 150. A different working distance is illuminated.

The sequence of FIGS. 10a to 10c shows a magnified view of the illumination arrangements 88, 88' and 88" with the associated area segments 140, 140', 140". FIG. 10a shows the first position and FIG. 10c shows the second position. FIG. 10b shows an intermediate position while rotating the lens device 120 relative to the illumination arrangements 88, 88' and 88" in the circumferential direction.

Figure 11A:
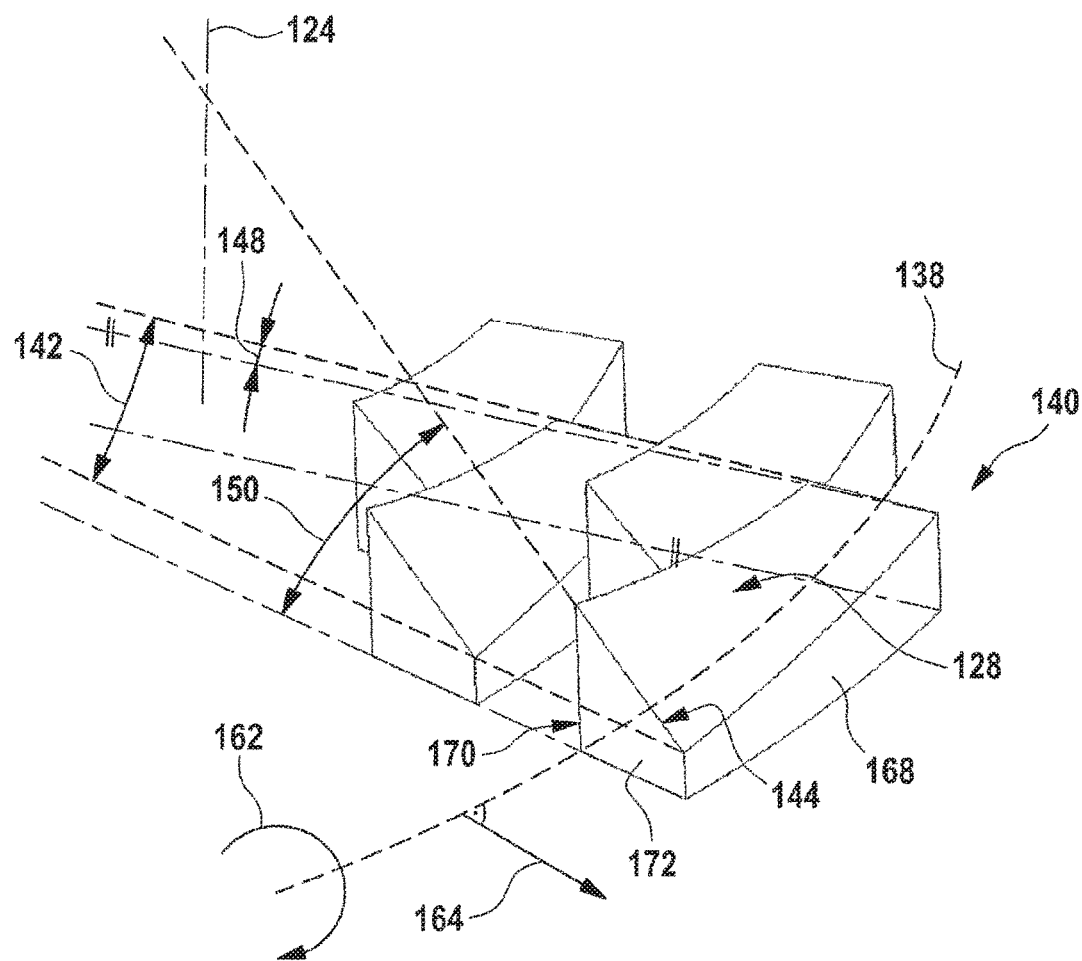
FIG. 11a shows a magnified view of a plurality of area segments of various ring regions.
Figure 11B:
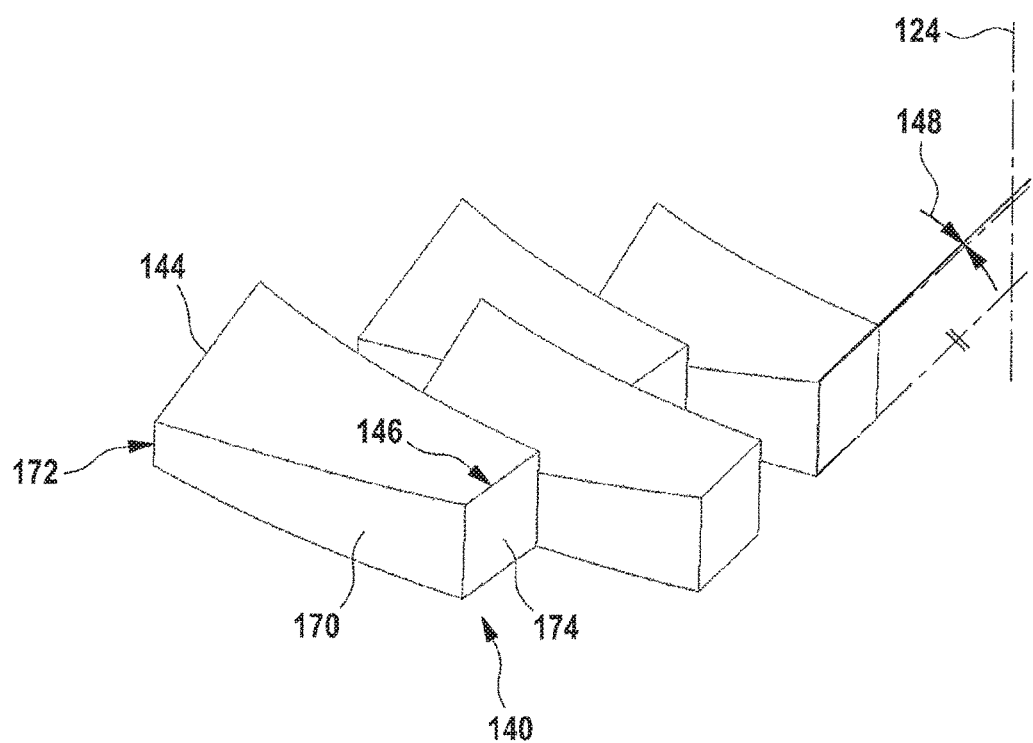
FIG. 11b shows the area segments from FIG. 11a in an opposing perspective.

FIGS. 11a and 11b depict, in opposing views, four individual area segments in isolation from four different ring regions in an exemplary manner. It is possible to identify that each area segment 140 is a circular arc portion 152 of a respective ring region. Accordingly, each area segment 140 comprises a radial outer surface 168, a radial inner surface 170, a side surface 172 at the first end 144 and a side surface 174 at the second end 146. Accordingly, the side surfaces 172 and 174 likewise lie in a plane containing around the central axis 124. Accordingly, there, the light-exit surface 128 has a first angle in the direction of the central axis 124 in relation to the light-entry surface 126 at the first end 144 and a second angle 150 in the direction of the central axis in relation to the light-entry surface 126 at the second end 146. In FIG. 11a, the central axis 124 is depicted schematically with an offset arrangement. As may be identified, a continuous linear transition of the first angle 128 to the second angle 150 can be obtained, in particular, by rotating the area segment 140 or the light-exit surface 128, in particular about the circumferential direction 130. In this way, the light-exit surface 128 in each area segment 140 becomes a free-form surface. This means that it does not have any symmetries.

Figure 11C:
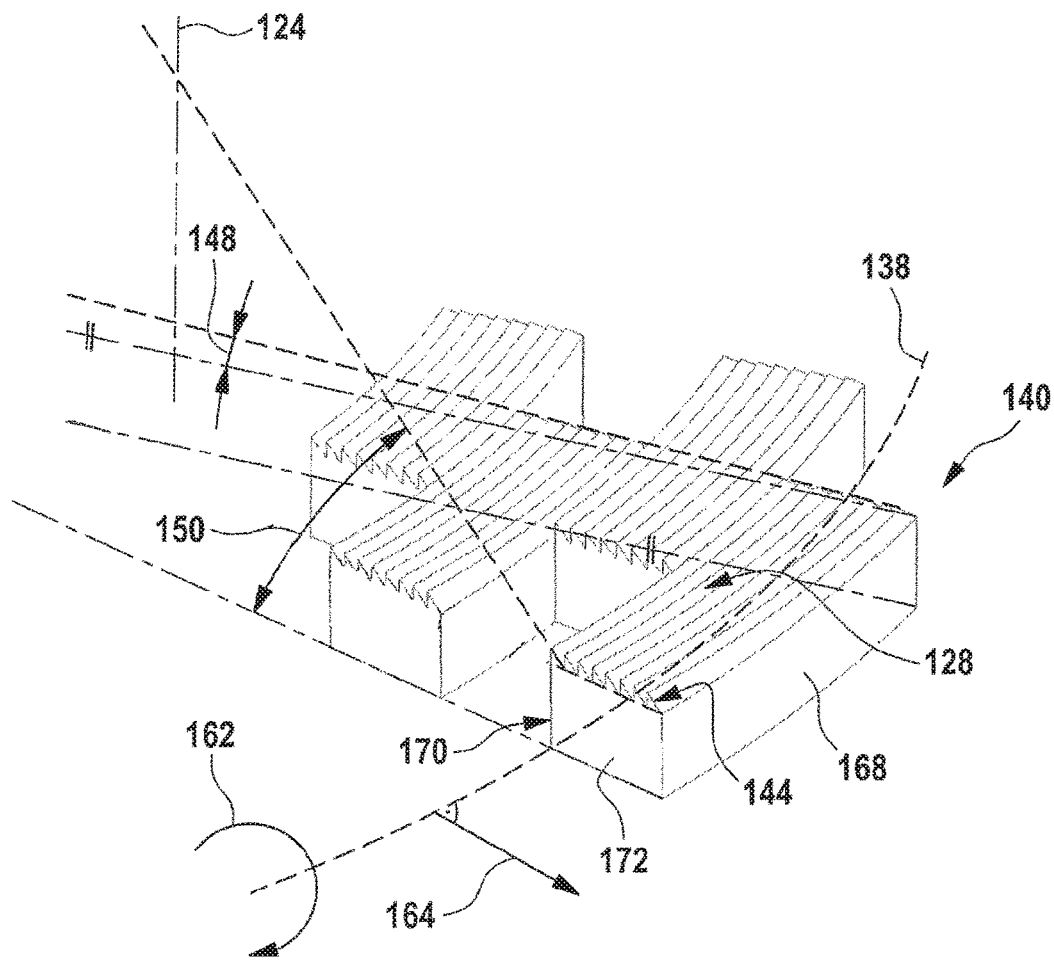
FIG. 11c shows a magnified view of a plurality of area segments of various ring regions in a further embodiment of a lens device.

FIG. 11c shows a further embodiment of a lens device 120. Identical elements are denoted by the same reference symbols and will not be explained again. In this embodiment, each of the lens segments 140 is Fresnelized, i.e. embodied as a Fresnel lens. For this, the light-exit surface 128 is Fresnelized in the presented embodiment. In principle, it is alternatively or cumulatively also possible for the light-entry surface 126 to be Fresnelized. To this end, each lens segment 140 has a multiplicity of surface sections 168 which extend parallel to one another and which are inclined by the same angle relative to the light-entry surface 126. Consequently, the respective first angles 148 and second angles 150 of the surface sections 168 correspond to one another. The respective angle profiles from the first angle 148 to the second angle 150 also correspond in the surface sections 168. Consequently, each Fresnelized lens segment 140 produces a respective acting angle or prismatic deflection in the direction of the central axis 124 like a non-Fresnelized lens segment 140, as is depicted in e.g. FIG. 11a.

Figure 12:
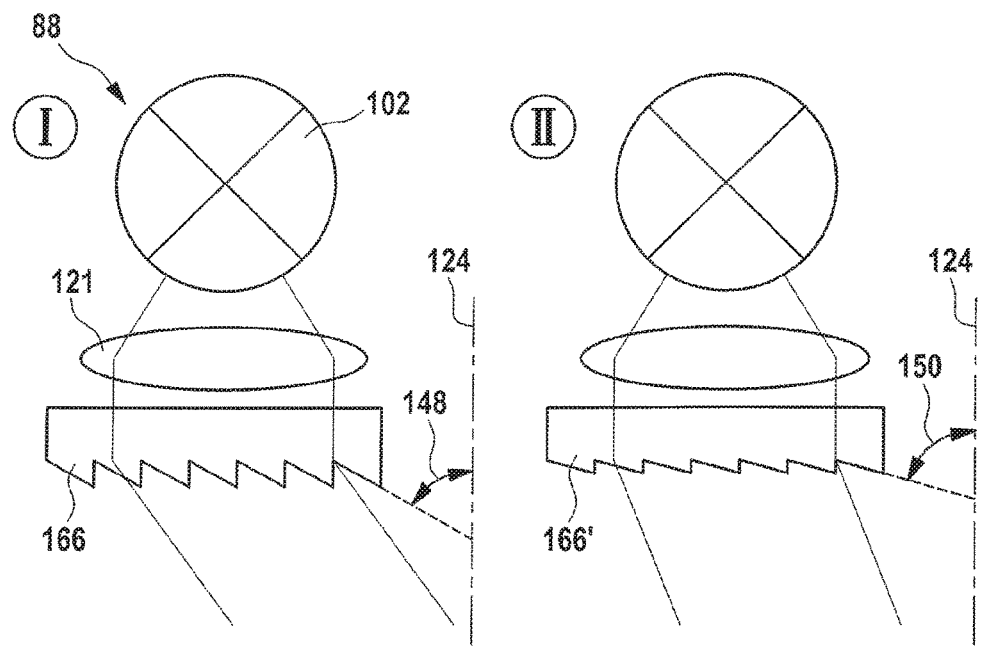
FIG. 12 shows a schematic visualization of an effect of rotating a lens device.

FIG. 12 purely schematically elucidates the effect of rotating the lens device 120 between the first position (I) and the second position (II). A light source 102, a collimation element 121 and the refractive effect of a lens device 120 in the form of a Fresnel example 166 are shown in a purely schematic manner. In the first position, the first angle 148 is provided in the direction of the central axis 124 in relation to the light-entry surface 126, said first angle otherwise—according to the prior art—for example requiring a first lens 166. In the second position, the second angle 150 would be provided, e.g. a second lens 166' otherwise being required therefor. However, this is not necessary with the lens device 120 according to the invention. The different angles 148 and 150 can be provided by simple rotating of the lens device.

Figure 13:
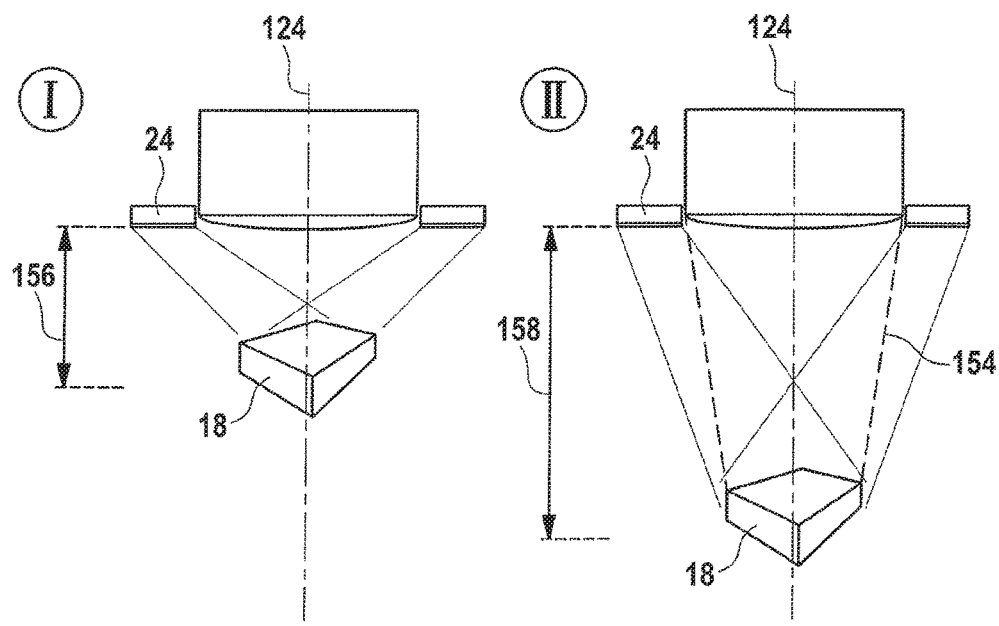
FIG. 13 shows a schematic visualization of rotating the lens device for providing a reflected light dark field illumination at different working distances.

This is once again schematically illustrated in FIG. 13. In the first position, a first working distance 156 may be illuminated as dark field top light illumination by means of an illumination assembly 24 according to the invention, which comprises a lens device 120. There is no need to interchange the illumination assembly 24 if the working distance is varied to a second working distance 158. By rotating the lens device 120 into the second position, it is possible to set the reflected light dark field illumination in an ideal manner to the new working distance 158, and so the object 18 to be measured is once again illuminated in a dark field.

Figure 14:
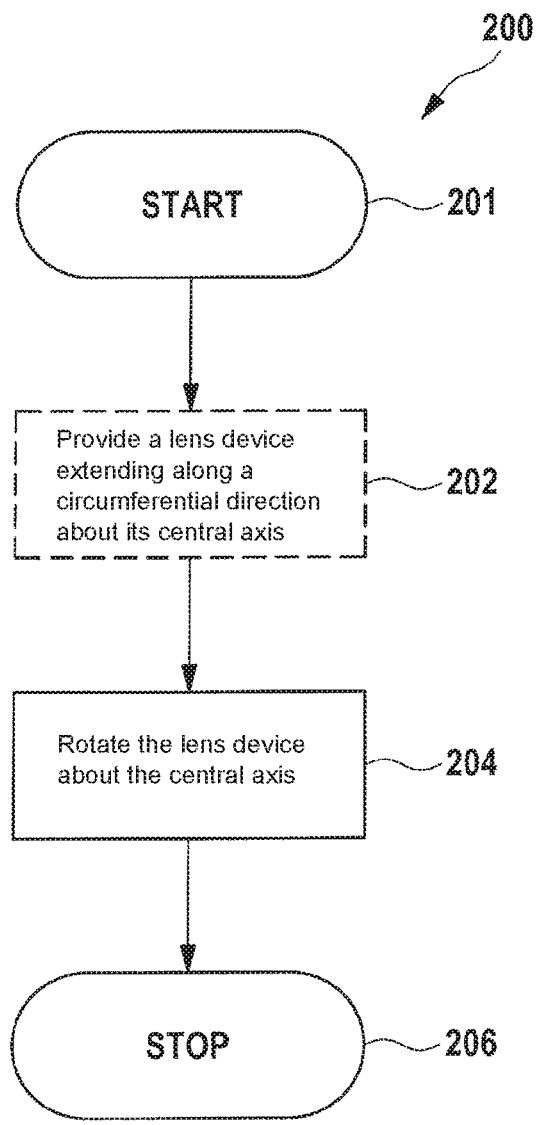
FIG. 14 shows an embodiment of a method for illuminating an object.

Accordingly, FIG. 14 depicts an embodiment of a method for illuminating an object 18 to be measured, in particular with a dark field top light illumination. The method is denoted generally by 200. In the method, a coordinate measuring machine comprising an illumination assembly having a lens device is provided, wherein the lens device extends, in particular in a ring-shaped manner, along a circumferential direction about a central axis 124 of the lens device. Finally, step 204 is carried out, wherein the lens device is rotated about the central axis 124. In particular, the central axis 124 may be an optical axis of an imaging optical unit of an optical sensor of the coordinate measuring machine. This may be the case for the central axis 124 in all configurations of the invention.

Moreover, a step 202 may be carried out in advance, according to which a lens device 120 is provided, said lens device comprising a light-entry surface 126 and a light-exit surface 128, wherein the light-exit surface 128 comprises at least one ring region 130, 132, 134, 136, wherein each ring region 130, 132, 134, 136 extends along a circumferential direction 138 about a central axis 124 of the lens device 120, wherein each ring region 130, 132, 134, 136 comprises a plurality of area segments 140, wherein each area segment 140 forms a circular arc portion 142 of a respective ring region 130, 132, 134, 136 and wherein each area segment 140 comprises a first end 144 in the circumferential direction 138 and a second end 146 opposite to the first end 144 in the circumferential direction 138, wherein, at the first end 144, the light-exit surface 128 is inclined in the direction of the central axis 124 by an arbitrary first angle 148 in relation to the light-entry surface 126 and wherein, at the second end 146, the light-exit surface 128 is inclined in the direction of the central axis 124 by an arbitrary second angle 150 in relation to the light-entry surface 126, said second angle differing from the first angle 148.

What is claimed is:

1. A lens device for an illumination assembly, said lens device having a light-entry surface and a light-exit surface, wherein the lens device comprises at least one ring region, wherein each ring region extends along a circumferential direction about a central axis of the lens device, wherein each ring region comprises a plurality of area segments, wherein each area segment forms a circular arc portion of a respective ring region and wherein each area segment comprises a first end in the circumferential direction and a second end opposite to the first end in the circumferential direction, wherein, at the first end, the light-exit surface is inclined in the direction of the central axis by an arbitrary first angle in relation to the light-entry surface and wherein, at the second end, the light-exit surface is inclined in the direction of the central axis by an arbitrary second angle in relation to the light-entry surface, said second angle differing from the first angle, wherein all area segments of the same ring region have the same first angle in the direction of the central axis at the first end and the same second angle in the direction of the central axis at the second end, and wherein the respective first angles of the ring regions are different from one another and the respective second angles of the ring regions are different from one another.

2. The lens device as claimed in claim 1, wherein the area segments of a respective ring region are arranged immediately adjoining one another.

3. The lens device as claimed in claim 1, wherein each area segment is embodied with a continuous transition in the circumferential direction from the first angle to the second angle.

4. The lens device as claimed in claim 3, wherein the continuous transition extends in a continuously increasing and/or linear fashion from the first angle to the second angle.

5. The lens device as claimed in claim 1, wherein at least one ring region is a completely closed ring and/or at least one ring region is a portion of a ring.

6. The lens device as claimed in claim 1, wherein each ring region is a completely closed ring.

7. The lens device as claimed in claim 1, wherein the lens device comprises a plurality of ring regions which are arranged in a concentric fashion about the central axis.

8. The lens device as claimed in claim 7, wherein at least two of the ring regions are arranged at different radial distances from the central axis.

9. The lens device as claimed in claim 1, wherein the lens device is integral.

10. The lens device as claimed in claim 1, wherein the lens device overall has the form of a closed ring which is arranged around the central axis.

11. The lens device as claimed in claim 1, wherein an absolute value of the first angle of at least one of the ring regions lies in a range of 0° to 44.9° inclusive and an absolute value of the second angle of at least one of the ring regions lies in a range of 20° to 90° inclusive.

12. The lens device according to claim 11, wherein the absolute value of the first angle of at least one of the ring regions lies in a range of 5° to 19.9° and the absolute value of the second angle of at least one of the ring regions lies in a range of 20° to 45°.

13. The lens device as claimed in claim 1, wherein the lens device comprises a free central region radially within the at least one ring region.

14. The lens device as claimed in claim 1, wherein each area segment is embodied as a free-form surface.

15. The lens device as claimed in claim 1, wherein at least one of the area segments has a Fresnelized embodiment.

16. The lens device as claimed in claim 1, wherein the area segments of a respective ring region of the at least one ring region are identical.

17. An illumination assembly for a measuring machine for measuring a workpiece by means of an optical sensor, comprising at least one illumination arrangement, and wherein the illumination assembly further comprises a lens device having a light-entry surface and a light-exit surface, wherein the lens device comprises at least one ring region, wherein each ring region extends along a circumferential direction about a central axis of the lens device, wherein each ring region comprises a plurality of area segments, wherein each area segment forms a circular arc portion of a respective ring region and wherein each area segment comprises a first end in the circumferential direction and a second end opposite to the first end in the circumferential direction, wherein, at the first end, the light-exit surface is inclined in the direction of the central axis by an arbitrary first angle in relation to the light-entry surface and wherein, at the second end, the light-exit surface is inclined in the direction of the central axis by an arbitrary second angle in relation to the light-entry surface, said second angle differing from the first angle, wherein the illumination assembly comprises a plurality of illumination arrangements and wherein an illumination arrangement is assigned to each area segment.

18. The illumination assembly as claimed in claim 17, wherein the illumination assembly comprises at least one drive device for rotating the lens device about the central axis relative to the at least one illumination assembly.

19. An illumination assembly for a measuring machine for measuring a workpiece by means of an optical sensor, comprising at least one illumination arrangement, and wherein the illumination assembly further comprises a lens device having a light-entry surface and a light-exit surface, wherein the lens device comprises at least one ring region, wherein each ring region extends along a circumferential direction about a central axis of the lens device, wherein each ring region comprises a plurality of area segments, wherein each area segment forms a circular arc portion of a respective ring region and wherein each area segment comprises a first end in the circumferential direction and a second end opposite to the first end in the circumferential direction, wherein, at the first end, the light-exit surface is inclined in the direction of the central axis by an arbitrary first angle in relation to the light-entry surface and wherein, at the second end, the light-exit surface is inclined in the direction of the central axis by an arbitrary second angle in relation to the light-entry surface, said second angle differing from the first angle, wherein the at least one illumination arrangement comprises a light source and/or the illumination arrangement is a light-exit surface of an optical waveguide.

20. A coordinate measuring machine for measuring a workpiece by means of an optical sensor, wherein the coordinate measuring machine further comprises an illumination assembly comprising at least one illumination arrangement, wherein the illumination assembly further comprises a lens device having a light-entry surface and a light-exit surface, wherein the lens device comprises at least one ring region, wherein each ring region extends along a circumferential direction about a central axis of the lens device, wherein each ring region comprises a plurality of area segments, wherein each area segment forms a circular arc portion of a respective ring region and wherein each area segment comprises a first end in the circumferential direction and a second end opposite to the first end in the circumferential direction, wherein, at the first end, the light-exit surface is inclined in the direction of the central axis by an arbitrary first angle in relation to the light-entry surface and wherein, at the second end, the light-exit surface is inclined in the direction of the central axis by an arbitrary second angle in relation to the light-entry surface, said second angle differing from the first angle, wherein a measurement cone of the optical sensor extends along the central axis, wherein the illumination assembly comprises a plurality of illumination arrangements and wherein an illumination arrangement is assigned to each area segment.

21. A method for changing an illumination working distance of a coordinate measuring machine, wherein the coordinate measuring machine comprises an illumination assembly comprising a lens device, wherein the lens device extends along a circumferential direction about a central axis of the lens device, wherein the lens device has a light-entry surface and a light-exit surface, wherein the lens device comprises at least one ring region, wherein each ring region extends along a circumferential direction about a central axis of the lens device, wherein each ring region comprises a plurality of area segments, wherein each area segment forms a circular arc portion of a respective ring region and wherein each area segment comprises a first end in the circumferential direction and a second end opposite to the first end in the circumferential direction, wherein, at the first end, the light-exit surface is inclined in the direction of the central axis by an arbitrary first angle in relation to the light-entry surface and wherein, at the second end, the light-exit surface is inclined in the direction of the central axis by an arbitrary second angle in relation to the light-entry surface, said second angle differing from the first angle, wherein all area segments of the same ring region have the same first angle in the direction of the central axis at the first end and the same second angle in the direction of the central axis at the second end, and wherein the respective first angles of the ring regions are different from one another, and the respective second angles of the ring regions are different from one another, said method comprising the following step:

Rotating the lens device about the central axis.

* * * * *